US011029990B2

(12) United States Patent
Chakraborty et al.

(10) Patent No.: US 11,029,990 B2
(45) Date of Patent: Jun. 8, 2021

(54) DELIVERING A SINGLE END USER EXPERIENCE TO A CLIENT FROM MULTIPLE SERVERS

(71) Applicant: Microsoft Technology Licensing, LLC, Redmond, WA (US)

(72) Inventors: Parag Chakraborty, Sunnyvale, CA (US); Bradley Post, San Francisco, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 56 days.

(21) Appl. No.: 16/288,465

(22) Filed: Feb. 28, 2019

(65) Prior Publication Data

US 2019/0196858 A1 Jun. 27, 2019

Related U.S. Application Data

(63) Continuation of application No. 13/274,041, filed on Oct. 14, 2011, now abandoned.

(51) Int. Cl.
*G06F 9/455* (2018.01)
*G06F 9/50* (2006.01)
*G06F 9/451* (2018.01)
*G06F 3/14* (2006.01)

(52) U.S. Cl.
CPC .......... *G06F 9/45558* (2013.01); *G06F 9/452* (2018.02); *G06F 9/505* (2013.01); *G06F 3/1454* (2013.01); *G06F 2009/45562* (2013.01); *G06F 2209/549* (2013.01)

(58) Field of Classification Search
CPC ......... G06F 3/1454; G06F 2009/45562; G06F 2209/549; G06F 9/452; G06F 9/45558; G06F 9/505

USPC .......................................................... 345/520
See application file for complete search history.

(56) References Cited

U.S. PATENT DOCUMENTS

| | | | |
|---|---|---|---|
| 8,429,652 B2* | 4/2013 | Muthiah | G06F 9/50 718/1 |
| 2007/0008324 A1* | 1/2007 | Green | G06T 1/00 345/501 |
| 2010/0115510 A1* | 5/2010 | Ford | G06F 9/5077 718/1 |
| 2010/0169536 A1* | 7/2010 | Shedel | G06F 9/45558 711/6 |

(Continued)

OTHER PUBLICATIONS

"Office Action Issued in European Patent Application No. 12840204. 7", dated Feb. 19, 2019, 8 Pages.

*Primary Examiner* — Sae Won Yoon
(74) *Attorney, Agent, or Firm* — Alleman Hall Creasman & Tuttle LLP

(57) ABSTRACT

Methods, systems, and computer readable media are disclosed for creating a multi-port client server connection in a remote desktop environment. In an embodiment, the multi-client server connection can decouple client-server connection and client-server input from graphics delivery from the server to the client. Such embodiment provides higher server performance and enables dynamic server resource management. The multi-client server connection can be implemented in a virtual environment or between physical machines where one set of physical machines receives the graphics requests from the client and another set of physical machines generates and transmits display data to the client.

19 Claims, 14 Drawing Sheets

(56) References Cited

U.S. PATENT DOCUMENTS

| | | | | |
|---|---|---|---|---|
| 2010/0226441 | A1* | 9/2010 | Tung | H04N 19/132 375/240.24 |
| 2010/0250868 | A1* | 9/2010 | Oshins | G06F 9/45558 711/154 |
| 2011/0134111 | A1* | 6/2011 | Stone | G06F 9/45541 345/419 |
| 2011/0265083 | A1* | 10/2011 | Davis | G06F 12/0866 718/1 |

* cited by examiner

DELIVERING A SINGLE END USER EXPERIENCE TO A CLIENT FROM MULTIPLE SERVERS

CROSS-REFERENCE

This application is a continuation of U.S. patent application Ser. No. 13/274,041 filed on Oct. 14, 2011, the entire contents are incorporated herein by reference.

BACKGROUND

Remote computing systems may enable users to access resources hosted by the remote computing systems. Servers on the remote computing systems can execute programs and transmit signals indicative of a user interface to clients that can connect by sending signals over a network conforming to a communication protocol such as TCP/IP, UDP, or other protocols. Each connecting client may be provided a virtual desktop or a session, i.e., an execution environment that includes a set of resources. Each client can transmit signals indicative of user input to the server and the server can apply the user input to the appropriate session. The clients may use protocols such as the Remote Desktop Protocol (RDP) to connect to a server resource.

With an increased availability of network bandwidth and an increased demand for rich 2D and 3D client graphics applications, there has been a shift in the remote computing system architectures. Instead of relying purely on local computing power, servers incorporate graphics virtualization platforms that shift graphics processing intelligence to hosted virtual desktop infrastructures (VDI) deployed in data centers. Clients experience virtual desktops in full fidelity, harnessing the graphics processing power of shared graphics processing units (GPUs) and processors installed on the VDI. An example of a graphics virtualization platform is Microsoft® RemoteFX® that builds on a Hyper-V® VDI architecture and integrates RDP to deliver new payload designed for hosted VDI desktops.

A typical VDI architecture can include a host partition and a number of guest partitions or virtual machines. The host partition has access to the underlying physical resources of the VDI, such as GPUs, central processing units (CPUs), and memory space, and can allocate and manage the access of the virtual machines to these resources. Each virtual machine has a set of virtual resources that are a virtualization of the allocated physical resources.

As such, in a remote computing system, a client can connect to a virtual machine or a virtual desktop session running therein, where an authentication of the client is managed. Data such as user input data or graphics data to be transmitted from the client to the virtual machine is initially transmitted to a network interface card (NIC) on the host partition and then re-routed to the virtual machine. The virtual machine can use its virtual resources to process the data. The virtual machine sends the processed data to the host partition for further processing on the underlying physical resources. The host partition further processes and sends the data back to the virtual machine for authentication with the client. The virtual machine packages and re-routes the data back to the host partition for transmission over the host partition NIC to the client. The repetitive traversal of the data between the host partition and the virtual machine can require intensive operations that can consume significant amount of memory and CPU resources and that can increase the data delivery latency to the client.

SUMMARY

Systems, methods, and computer readable media are disclosed for optimizing the processing of data, such as graphics data, received from clients in a remote computing system environment. Compared to current architectures, such optimization includes a reduction in usage of memory and CPU resources hosted and a reduction in data delivery latency to the clients.

In an embodiment, a client can initiate a first connection with another computing device such as a compute server to execute the client workload in a virtual desktop or a session therein. The compute server can authenticate the first connection and can acquire the client address. The compute server can then negotiate a connection with a graphics server and can initialize and instruct the graphics server to expect a connection originating from the client address. The compute server can also acquire from the graphics server a graphics server address. The compute server can provide the graphics server address to the client. In turn, the client can establish the third connection with the graphics server using the graphics server address. Once the connections are established, the client can provide a user's screen input, such as keyboard input, mouse input, and the like, to the compute server over the first connection. The compute server can process the provided input and output processed data such as display commands and calls. The compute server can send the processed data to the graphics server for processing. The graphics server can then process the data received and can send graphics output data to the client. As such, there is no need for the graphics server to send back the graphics output data to the compute server. Similarly, there is no need for the compute server to send the graphics output data to the client.

The compute server can be a guest partition or a virtual machine hosted on a virtualized computing system while the graphics server can be a host partition on the virtualized computing system. The first connection can be, for example, a TCP/IP, a UDP, or any other network-based communication and can comprise a remote desktop session connection. The second connection can comprise, for example, an intra-partition communication channel such as a VMBus, communication over a hypervisor (also known as a virtual machine monitor), a TCP/IP, a UDP, or any other network-based connection. The third connection can be, for example, a TCP/IP, a UDP, FCOE, 100 GB Ethernet, or any other network-based connection.

In an embodiment, a plurality of clients can be simultaneously connected to a plurality of compute servers and to a plurality of graphics servers. At the initial step of establishing a connection with and authenticating a client of the plurality of clients, a redirector and/or a broker can be used to connect the client to a first compute server of the plurality of compute servers. The redirector and/or broker can determine availabilities of the plurality of compute servers and allocate the connection between the client and the first compute server accordingly. As such, in case of load balancing of compute resources, techniques such as virtual machine live migration can seamlessly transfer the workload from the first compute server to a second compute server. The client connection to the second compute server can be re-established while a connection between the client and a graphics server of the plurality of graphics servers can remain the same. Similarly, a graphics server manager can also be used to connect the client connected compute server to a first graphics server of the plurality of graphics servers. The graphics server manager can determine availabilities of the plurality of graphics servers and allocate the connection between the client connected compute server and the first graphics server accordingly. As such, in case of load balancing of graphics servers, the client connected compute server can create a new connection with a second graphics server and can request the client to establish a new connection with the second graphics sever. The client can then seamlessly transition over to the second graphics server.

In an embodiment where a plurality of clients are simultaneously connected to a plurality of compute servers and a plurality of graphics servers, at least one client can be configured to receive rendered, captured, and compressed data from the plurality of graphics servers. As such, a user interfacing through the at least one client can view the rendered, captured, and compressed data originating from the one or more clients. Similarly, at least one graphics server can be configured to transmit rendered, captured, and compressed processed data originating from the plurality of clients to one client.

This summary is intended to provide an overview of aspects of the invention. It is not intended to identify any necessary steps or components of the invention. In addition to the foregoing, other aspects are described in the claims, drawings, and text forming a part of the present disclosure. It can be appreciated by one of skill in the art that one or more various aspects of the disclosure may include but are not limited to circuitry and/or programming for effecting the herein-referenced aspects of the present disclosure; the circuitry and/or programming can be virtually any combination of hardware, software, and/or firmware configured to effect the herein-referenced aspects depending upon the design choices of the system designer.

BRIEF DESCRIPTION OF THE DRAWINGS

The systems, methods, and computer media for optimizing the processing of data, such as graphics data, received in a remote computing environment in accordance with this specification are further described with reference to the accompanying drawings in which.

DETAILED DESCRIPTION OF ILLUSTRATIVE EMBODIMENTS

Figure 1:
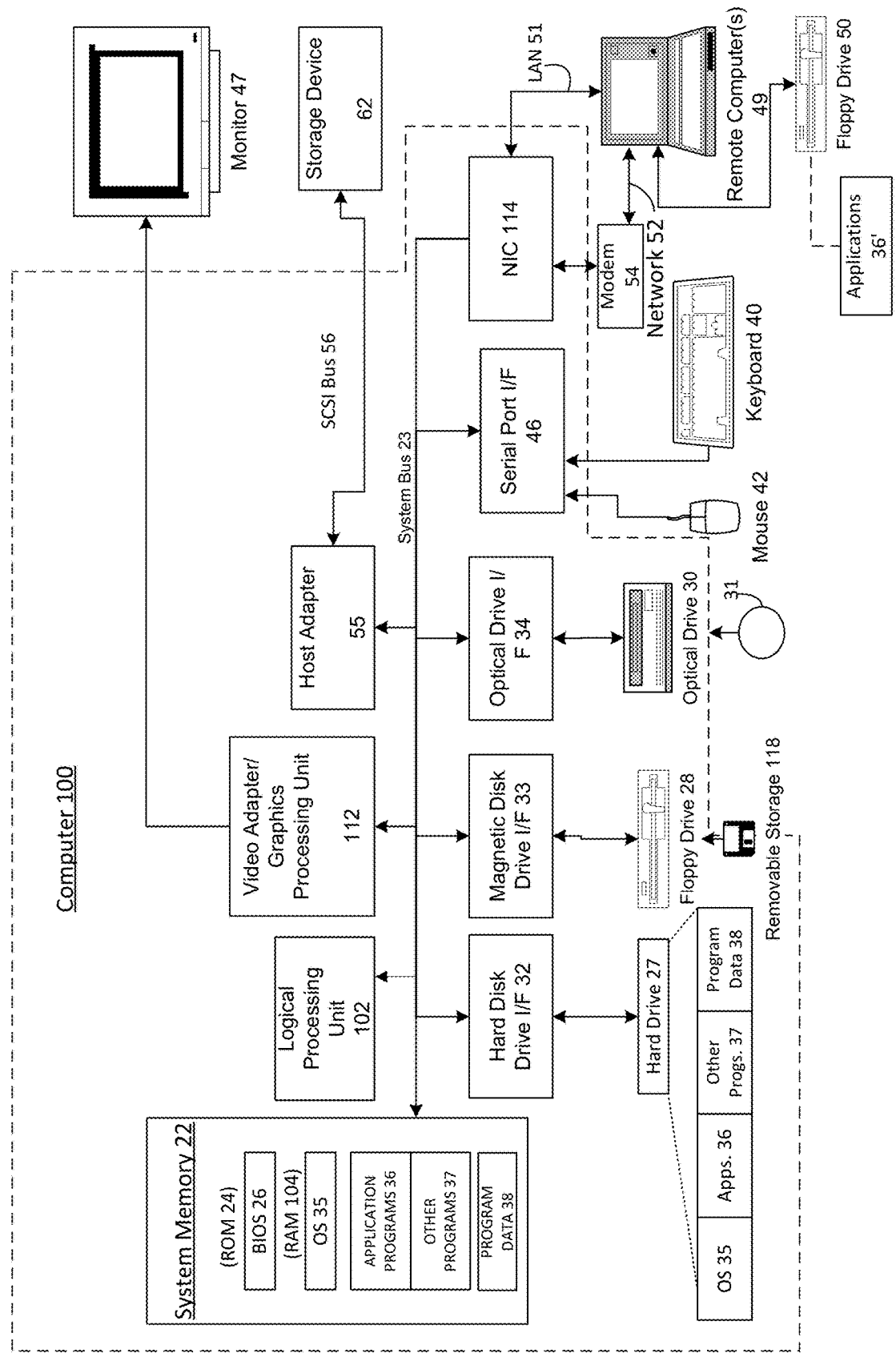
FIG. 1 depicts an example computing environment wherein aspects of the present disclosure can be implemented.

Certain specific details are set forth in the following description and figures to provide a thorough understanding of various embodiments of the disclosure. Certain well-known details often associated with computing and software technology are not set forth in the following disclosure to avoid unnecessarily obscuring the various embodiments of the disclosure. Further, those of ordinary skill in the relevant art will understand that they can practice other embodiments of the disclosure without one or more of the details described below. Finally, while various methods are described with reference to steps and sequences in the following disclosure, the description as such is for providing a clear implementation of embodiments of the disclosure, and the steps and sequences of steps should not be taken as required to practice this disclosure.

It should be understood that the various techniques described herein may be implemented in connection with hardware or software or, where appropriate, with a combination of both. Thus, the methods and apparatus of the disclosure, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the disclosure. In the case of program code execution on programmable computers, the computing device generally includes a processor, a storage medium readable by the processor (including volatile and non-volatile memory and/or storage elements), at least one input device, and at least one output device. One or more programs that may implement or utilize the processes described in connection with the disclosure, e.g., through the use of an application programming interface (API), reusable controls, or the like. Such programs are preferably implemented in a high level procedural or object oriented programming language to communicate with a computer system. However, the program(s) can be implemented in assembly or machine language, if desired. In any case, the language may be a compiled or interpreted language, and combined with hardware implementations.

The term circuitry used throughout the disclosure can include hardware components such as hardware interrupt controllers, hard drives, network adaptors, graphics processors, hardware based video/audio codecs, and the firmware/software used to operate such hardware. The term circuitry can also include microprocessors configured to perform function(s) by firmware or by switches set in a certain way or one or more logical processors, e.g., one or more cores of a multi-core general processing unit. The logical processor(s) in this example can be configured by software instructions embodying logic operable to perform function(s) that are loaded from memory, e.g., RAM, ROM, firmware, and/or virtual memory. In example embodiments where circuitry includes a combination of hardware and software an implementer may write source code embodying logic that is subsequently compiled into machine readable code that can be executed by a logical processor. Since one skilled in the art can appreciate that the state of the art has evolved to a point where there is little difference between hardware, software, or a combination of hardware/software, the selection of hardware versus software to effectuate functions is merely a design choice. Thus, since one of skill in the art can appreciate that a software process can be transformed into an equivalent hardware structure, and a hardware structure can itself be transformed into an equivalent software process, the selection of a hardware implementation versus a software implementation is left to an implementer.

Embodiments of the invention may execute on one or more computers. FIG. 1 and the following discussion are intended to provide a brief general description of a suitable computing environment in which the disclosure may be implemented. One skilled in the art can appreciate that computer systems can have some or all of the components described herein below.

FIG. 1 depicts an example of a computing system which is configured to work with aspects of the disclosure. The computing system can include a computer 100 or the like, including a logical processing unit 102, a system memory 22, and a system bus 23 that couples various system components including the system memory to the logical processing unit 102. The system bus 23 may be any of several types of bus structures including a memory bus or memory controller, a peripheral bus, and a local bus using any of a variety of bus architectures. The system memory includes read only memory (ROM) 24 and random access memory (RAM) 104. A basic input/output system 26 (BIOS), containing the basic routines that help to transfer information between elements within the computer 100, such as during start up, is stored in ROM 24. The computer 100 may further include a hard disk drive 27 for reading from and writing to a hard disk, not shown, a magnetic disk drive 28 for reading from or writing to a removable magnetic disk 118, and an optical disk drive 30 for reading from or writing to a removable optical disk 31 such as a CD ROM or other optical media. In some example embodiments, computer executable instructions embodying aspects of the disclosure may be stored in ROM 24, hard disk (not shown), RAM 104, removable magnetic disk 118, optical disk 31, and/or a cache of logical processing unit 102. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer readable media provide nonvolatile storage of computer readable instructions, data structures, program modules and other data for the computer 100. Although the environment described herein employs a hard disk, a removable magnetic disk 118 and a removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read only memories (ROMs) and the like may also be used in the operating environment.

A number of program modules may be stored on the hard disk, magnetic disk 118, optical disk 31, ROM 24 or RAM 104, including an operating system 35, one or more application programs 36, other program modules 37 and program data 38. A user may enter commands and information into the computer 100 through input devices such as a keyboard 40 and pointing device 42. Other input devices (not shown) may include a microphone, joystick, game pad, satellite disk, scanner or the like. These and other input devices are often connected to the logical processing unit 102 through a serial port interface 46 that is coupled to the system bus, but may be connected by other interfaces, such as a parallel port, game port or universal serial bus (USB). A display 47 or other type of display device can also be connected to the system bus 23 via an interface, such as a GPU/video adapter 112. In addition to the display 47, computers typically include other peripheral output devices (not shown), such as speakers and printers. The system of FIG. 1 also includes a host adapter 55, Small Computer System Interface (SCSI) bus 56, and an external storage device 62 connected to the SCSI bus 56.

The computer 100 may operate in a networked environment using logical connections to one or more remote computers, such as a remote computer 49. The remote computer 49 may be another computer, a server, a router, a network PC, a peer device or other common network node, a virtual machine, and typically can include many or all of the elements described above relative to the computer 100, although only a memory storage device 50 has been illustrated in FIG. 1. The logical connections depicted in FIG. 1 can include a local area network (LAN) 51 and a network 52, which, as one example is a wide area network (WAN). Such networking environments are commonplace in offices, enterprise wide computer networks, intranets and the Internet.

When used in a LAN networking environment, the computer 100 can be connected to the LAN 51 through a network interface controller (NIC) 114 or adapter. When used in a WAN networking environment, the computer 100 can typically include a modem 54 or other means for establishing communications over the network 52, such as the Internet. The modem 54, which may be internal or external, can be connected to the system bus 23 via the serial port interface 46. In a networked environment, program modules depicted relative to the computer 100, or portions thereof, may be stored in the remote memory storage device. It will be appreciated that the network connections shown are examples and other means of establishing a communications link between the computers may be used. Moreover, while it is envisioned that numerous embodiments of the disclosure are particularly well-suited for computer systems, nothing in this document is intended to limit the disclosure to such embodiments.

Figure 2:
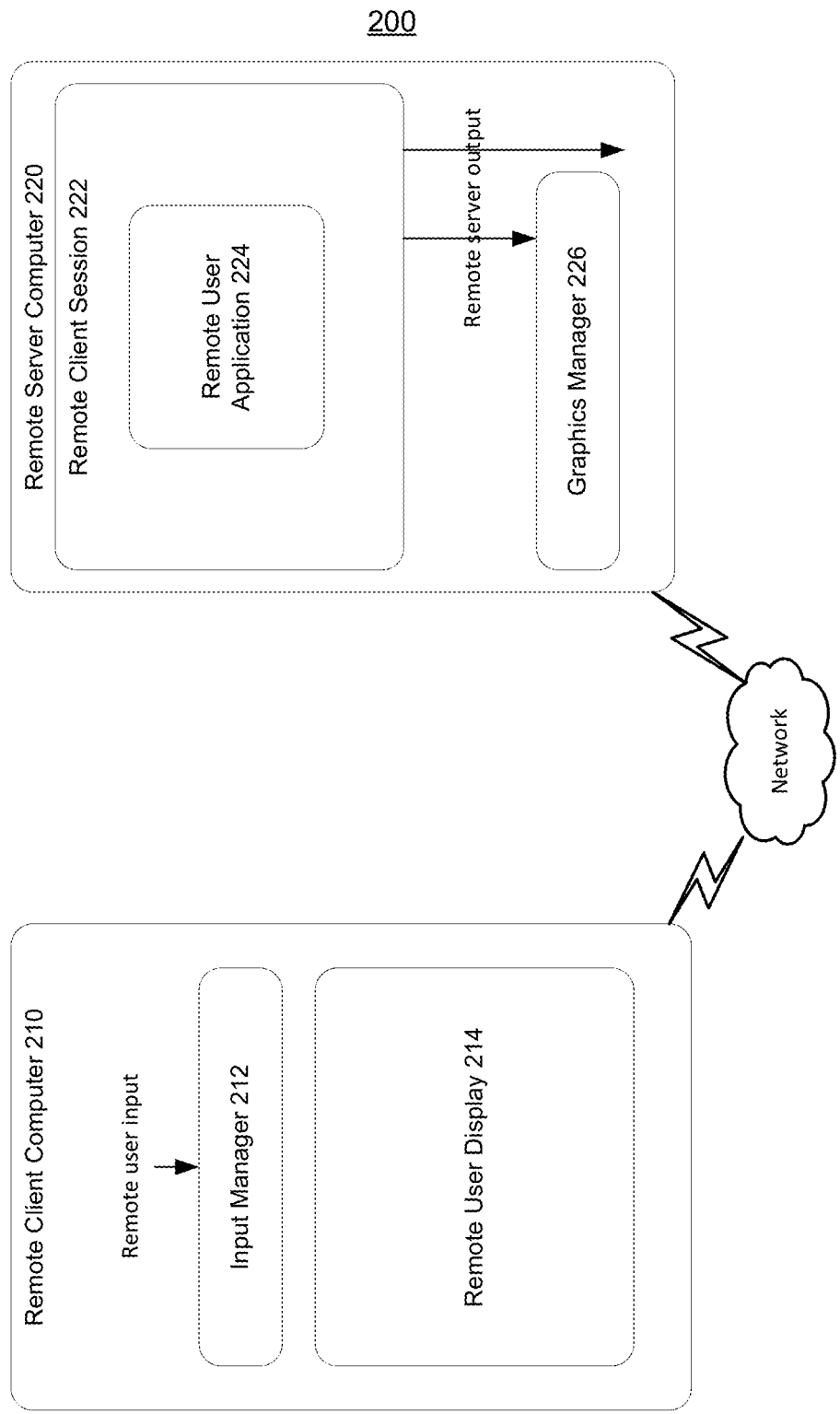
FIG. 2 depicts a remote computing environment for practicing aspects of the present disclosure.

In some instances, a user may desire to access computing applications remotely, i.e., applications that are running on a separate computing device. One implementation provides a user with such access through a remote desktop, such as a virtual desktop. Embodiments of a remote desktop system may execute one or more computers or may have some or all of the components described with respect to computer 100 of FIG. 1. A remote desktop system is a computer system that maintains applications that can be remotely executed by and displayed on client computer systems. FIG. 2 depicts an example architecture of a remote desktop system 200. The remote desktop system 200 can comprise a remote client computer 210 and a remote server computer 220. The remote client computer 210 and the remote server computer 220 are configured to conduct a remote session such as a virtual desktop session with each other.

As depicted, the remote server computer 220 serves a remote session to the remote client computer 210 where the remote server computer 220 sends client graphical output from executing user a remote client session 222. A remote user input is entered at the remote client computer 210. An input manager 212 can process and transfer the remote user input over a network (e.g., using protocols based on the International Telecommunications Union (ITU) T.120 family of protocols such as Remote Desktop Protocol (RDP)) to a remote user application 224 on the remote server computer 220. The network may be any type of communications network, such as a local area network, wide area network, cable network, the internet, the World Wide Web or a corporate enterprise network. The remote user application 224 can be executed in a remote client session 222 hosted on the remote server computer 220. The remote user application 224 processes the input as if the input were entered at the remote server computer 220. The remote user application 224 generates remote server output in response to the received input and the output is transferred over the network to the remote client computer 210. The remote client computer 210 presents the output data to a remote user. Thus, input is received and output is presented at the remote client computer 210, while processing actually occurs at the remote server computer 220.

In addition to the remote user application 224, the remote client session 222 can include a shell and a user interface such as a desktop, the subsystems that track mouse movement within the desktop, the subsystems that translate a mouse click on an icon into commands that effectuate an instance of a program, other applications, etc. It should be understood that the foregoing discussion is exemplary and that the presently disclosed subject matter may be implemented in various client/server environments and not limited to a particular remote presentation product.

In most, if not all remote desktop environments, the remote user input data (entered at the remote client computer 210) typically includes mouse and keyboard data representing commands to an application. Output data (generated by the remote user application at the remote server computer 220) typically includes graphics data for display at the remote client computer 210. Many remote desktop environments also include functionality that extends to transfer other types of data. In an example embodiment, graphics data output from the user application 224 can be sent to a graphics manager 226 hosted on the remote server computer 220. The graphics manager 226 can render, capture, compress, and transfer the graphics data over the network to a remote user display 214 on the remote client computer 210. The remote user display 214 can display the graphics output data to a remote user.

Figure 3:
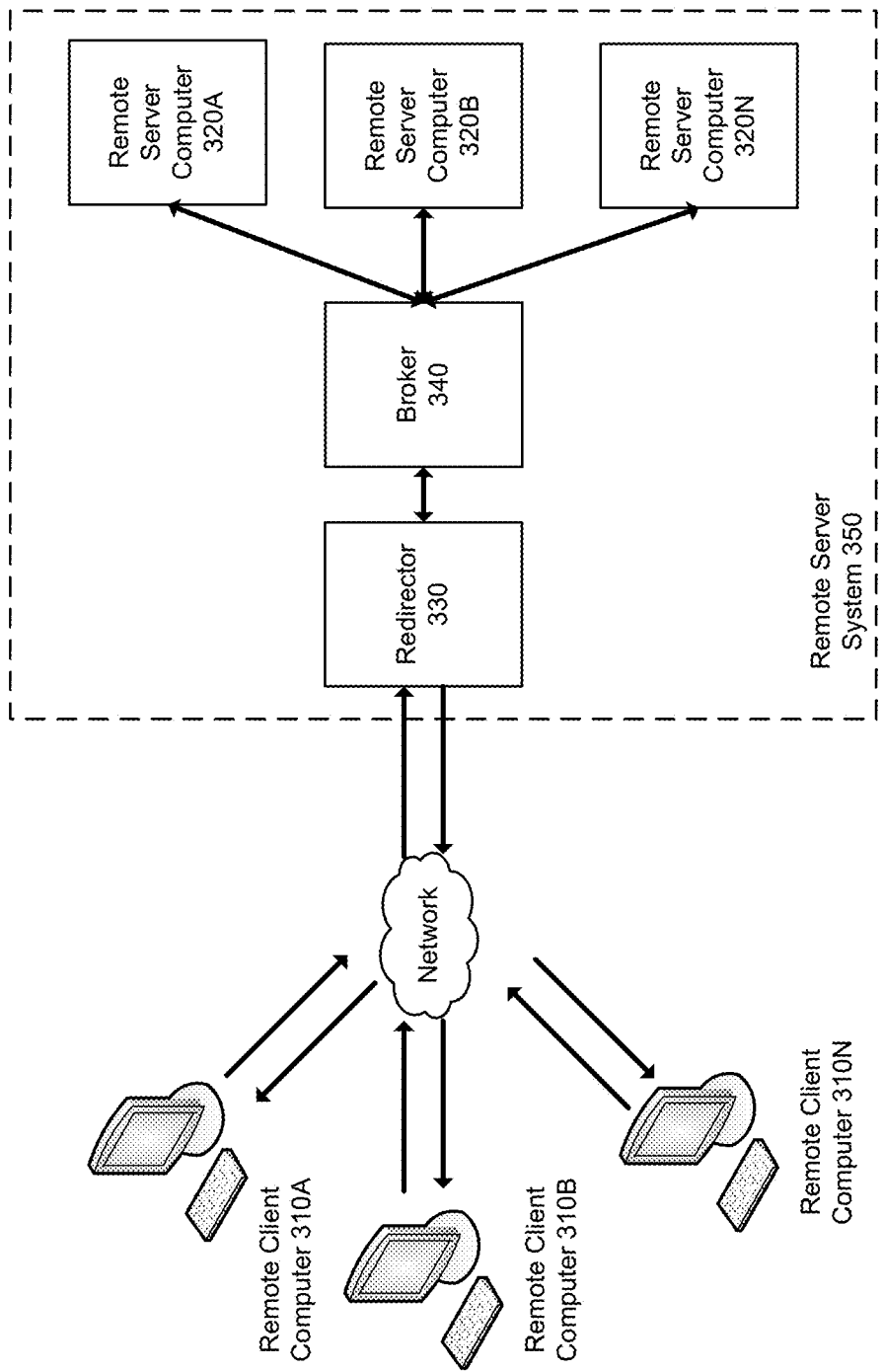
FIG. 3 depicts a remote environment where a plurality of clients can connect to a plurality of remote servers for practicing aspects of the present disclosure.

In an embodiment of a remote desktop environment, a remote server computer may execute a plurality of remote sessions (or virtual desktops) for a plurality of remote client computers. As such, a broker may be used to control the allocation of sessions to the plurality of remote client computers. Additionally, in a remote desktop environment, there may be a plurality of remote server computers that can serve a particular remote client computer. As such, a redirector may be used to control the allocation of remote server computers serving the particular remote client computer. FIG. 3 depicts an example embodiment of such remote desktop system 300.

The plurality of remote client computers 310(A-N) may be any computing devices capable of communicating with a remote server system 350 over a network, such as the remote client computer 210 of FIG. 2. The remote server system 350 may comprise a redirector 330, a broker 340, and a plurality of remote server computers 320(A-N). The redirector 330 and the broker 340 may be computing devices that include processors and memories configured to implement the respective functionalities of these devices as described herein below. The remote server computers 320(A-N) may have some or all of the components described with respect to computer 100 of FIG. 1 and remote server computer 220 of FIG. 2. The remote server computers 320(A-N) may also be implemented as virtual machines. The virtual machines can be executed on a single hardware infrastructure or on separate hardware infrastructures. The broker 340 may be a standalone device connected to the redirector 330 using a gateway (not shown), may be disposed within the redirector 330, or may be disposed within the remote server computers 320(A-N). The redirector 330 may also be disposed in the remote server computers 320(A-N).

The broker 340 allocates a session to a remote client computer based on session state information stored in the broker 340. Session state information may include, for example, session IDs, user names, names of the remote server computers where sessions are residing, the number of active sessions in each remote server computer, and so on. As used herein a session may be a virtual desktop session (also known as virtual machine session).

A remote client computer 310 first connects to the redirector 330 that may provide load balancing of remote client computers 310(A-N). In such a case, the redirector 330 typically first receives the request for a connection. The redirector 330 then accepts the connection request and queries the broker 340 to determine where the remote client computer 310 be redirected. The broker 340 analyzes the session state information of that particular environment and identifies a remote server computer 320 to which the remote client computer 310 can be redirected. The identified remote server computer 320 may possess a session previously accessed by the remote client computer 310, but later disconnected, to which the remote client computer 310 can be reconnected again. In an embodiment, an identified remote server computer 320 may provide a new session to which the remote client computer 310 can be connected, provided the remote client computer 310 does not possess any other existing sessions.

The broker 340 sends information to the requested remote server computer 320 enabling the remote client computer 320 to establish a connection with the identified remote server computer 310. For example, the information may include a machine ID, a session ID, and location of the identified remote server computer 320. Once the remote client computer 310 establishes the connection with the identified remote server computer 320, the remote client computer 310 can access applications present in the identified remote server computer 320. These applications may be compatible to the logic of the broker 340 that was used in identifying the remote server computer 320 in the remote server system 350.

In an embodiment, the systems described above may be used to connect, for example, a remote client computer 310 to one of a plurality of virtual desktops or sessions therein running on a remote server computer. The remote client computer examines a redirector token in a remote desktop protocol (RDP) packet. The remote client computer connects to one of the many virtual desktops based on information contained in the redirector token.

In another embodiment, a remote client computer 310 can be connected to one of the virtual desktops using the broker 340 and a pool manager (not shown). The pool manager may be disposed within the broker 340. The broker 340 assigns the virtual desktops to the remote client computer 310 when the remote client computer 310 is connected to a virtual desktop hosted on a virtual machine (VM), and the pool manager indicates which of the virtual desktops are available to be assigned.

In a further embodiment, the remote client computer 310 can be connected to a virtual desktop. The remote client computer 310 indicates a network name that is used by the broker 340 to generate an internet protocol (IP) address and to establish connection between the remote client computer 310 and the virtual desktops. By hiding the individual virtual desktop IP addresses from the remote client computers 310(A-N), only a single network name of the broker 340 is initially needed to be externally exposed to the remote client computers 310(A-N).

Figure 4:
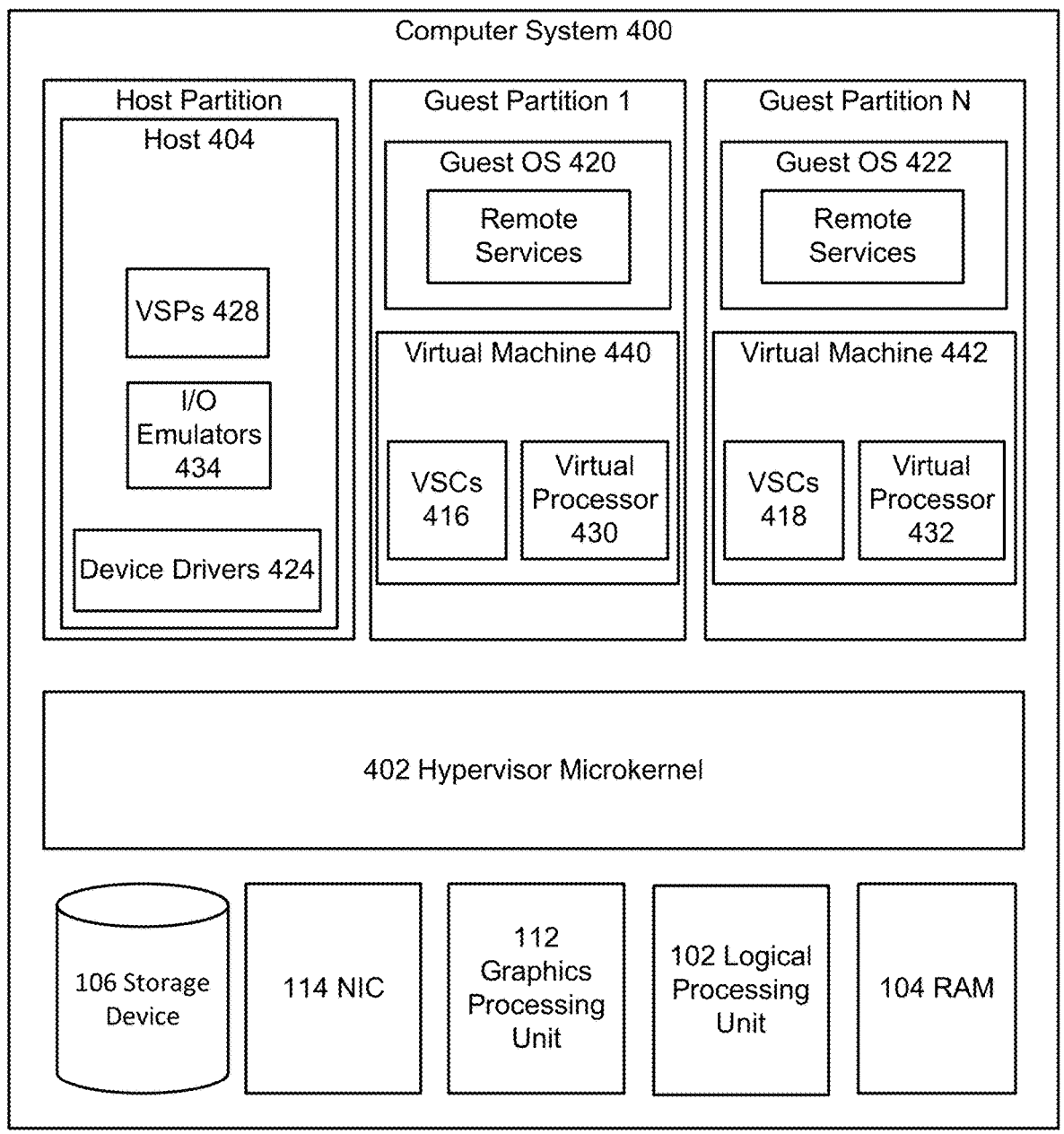
FIG. 4 depicts an example virtual machine environment, with a plurality of virtual machines.

FIG. 4 illustrates an example virtual machine environment, with a plurality of virtual machines. A virtualized computer system 400 can be used to implement the remote server computer 220 of FIG. 2 and the remote server computers 320(A-N) of FIG. 3.

As shown in FIG. 4, computer system 400 can include elements described in FIG. 1 and components operable to effectuate virtual machines. One such component is a hypervisor microkernel 402 that may also be referred to in the art as a virtual machine monitor. The hypervisor microkernel 402 can be configured to control and arbitrate access to the hardware of computer system 400. The hypervisor microkernel 402 can generate execution environments called partitions such as guest partition 1 through guest partition N (where N is an integer greater than 1). Here, a guest partition is the basic unit of isolation supported by hypervisor microkernel 402. A guest partition may also be known as a child partition. Hypervisor microkernel 402 can isolate processes in one partition from accessing another partition's resources. Each guest partition can be mapped to a set of hardware resources, e.g., memory, devices, processor cycles, etc., that is under control of the hypervisor microkernel 402. In embodiments hypervisor microkernel 402 can be a stand-alone software product, a part of an operating system, embedded within firmware of the motherboard, specialized integrated circuits, or a combination thereof.

Hypervisor microkernel 402 can enforce partitioning by restricting a guest operating system's view of the memory in a physical computer system. When hypervisor microkernel 402 instantiates a virtual machine, it can allocate pages, e.g., fixed length blocks of memory with starting and ending addresses, of system physical memory (SPM) to the virtual machine as guest physical memory (GPM). Here, the guest's restricted view of system memory is controlled by hypervisor microkernel 402. The term guest physical memory is a shorthand way of describing a page of memory from the viewpoint of a virtual machine and the term system physical memory is shorthand way of describing a page of memory from the viewpoint of the physical system. Thus, a page of memory allocated to a virtual machine will have a guest physical address (the address used by the virtual machine) and a system physical address (the actual address of the page).

A guest operating system may virtualize guest physical memory. Virtual memory is a management technique that allows an operating system to over commit memory and to give an application sole access to a contiguous working memory. In a virtualized environment, a guest operating system can use one or more page tables to translate virtual addresses, known as virtual guest addresses into guest physical addresses. In this example, a memory address may have a guest virtual address, a guest physical address, and a system physical address.

In the depicted example, the computer system 400 includes a host partition that can also be thought of as similar to domain 0 of Xen's open source hypervisor. The host partition may also be referred as a parent partition or a root partition. As depicted, the host partition can include a host 404. The host 404 can include device drivers 424 that allow the interaction of applications with the underlying physical hardware of computer system 400. As such, the host 404 can have access to physical hardware of computer system 400, such as logical processing unit 102, GPU 112, and NIC 114. The host 404 can be an operating system (or a set of configuration utilities).

The host 404 can be configured to provide resources to guest operating systems executing in the guest partitions 1-N by using virtualization service providers 428 (VSPs). VSPs 428, which are typically referred to as back-end drivers in the open source community, can be used to multiplex the interfaces to the hardware resources by way of virtualization service clients (VSCs) (typically referred to as front-end drivers in the open source community or paravirtualized devices). As shown in FIG. 4, virtualization service clients execute within the context of guest operating systems. However, these drivers are different than the rest of the drivers in the guest in that they may be supplied with a hypervisor, not with a guest. In an exemplary embodiment the path used to by virtualization service providers 428 to communicate with VSCs 416 and 418 can be thought of as the virtualization path.

The host partition VSPs 428 and the guest partition VSCs 416 and 418 can connect to a virtual machine bus (VMBus). The VMBus is a logical channel which enables inter-partition communication. The guest partitions requests to the virtual resources, such as the virtual processors 430 and 432, can be redirected via the VMBus to the devices in the host partition which can manage the requests. The response from the host partition to the guest partition can also be redirected via the VMBus. This entire process can be transparent to the guest OSes 220 and 222. In another embodiment, the host partition VSPs 228 and the guest partition VSCs 216 and 218 can communicate over a network, such as a TCP/IP network, by sending and receiving message packets.

As shown in FIG. 4, emulators 434, e.g., virtualized IDE devices, virtualized video adaptors, virtualized NICs, etc., can be configured to run within the host 404 and are attached to resources available to guest operating systems 420 and 422. For example, when a guest OS touches a memory location mapped to where a register of a device would be or memory mapped device, hypervisor microkernel 402 can intercept the request and pass the values the guest attempted to write to an associated emulator. Here, the resources in this example can be thought of as where a virtual device is located. The use of emulators in this way can be considered the emulation path. The emulation path is inefficient compared to the virtualized path because it requires more CPU resources to emulate device than it does to pass messages between VSPs and VSCs. For example, the hundreds of actions on memory mapped to registers needed in order to write a value to disk via the emulation path may be reduced to a single message passed from a VSC to a VSP in the virtualization path.

Each guest partition can include one or more virtual processors (430 and 432) that guest operating systems (420 and 422) can manage and schedule threads to execute thereon. Generally, the virtual processors are executable instructions and associated state information that provides a representation of a physical processor with a specific architecture. For example, one virtual machine may have a virtual processor having characteristics of an Intel x86 processor, whereas another virtual processor may have the characteristics of a PowerPC processor. The virtual processors in this example can be mapped to processors of the computer system such that the instructions that effectuate the virtual processors will be backed by processors. Thus, in an embodiment including multiple processors, virtual processors can be simultaneously executed by processors while, for example, other processor execute hypervisor instructions. The combination of virtual processors and memory in a partition can be considered a virtual machine.

Guest operating systems (420 and 422) can be any operating system such as, for example, operating systems from Microsoft®, Apple®, the open source community, etc. The guest operating systems can include user/kernel modes of operation and can have kernels that can include schedulers, memory managers, etc. Generally speaking, kernel mode can include an execution mode in a processor that grants access to at least privileged processor instructions. Each guest operating system can have associated file systems that can have applications stored thereon such as remote services or virtual desktop sessions, terminal servers, e-commerce servers, email servers, etc., and the guest operating systems themselves. The guest operating systems can schedule threads to execute on the virtual processors and instances of such applications can be effectuated.

Figure 5:
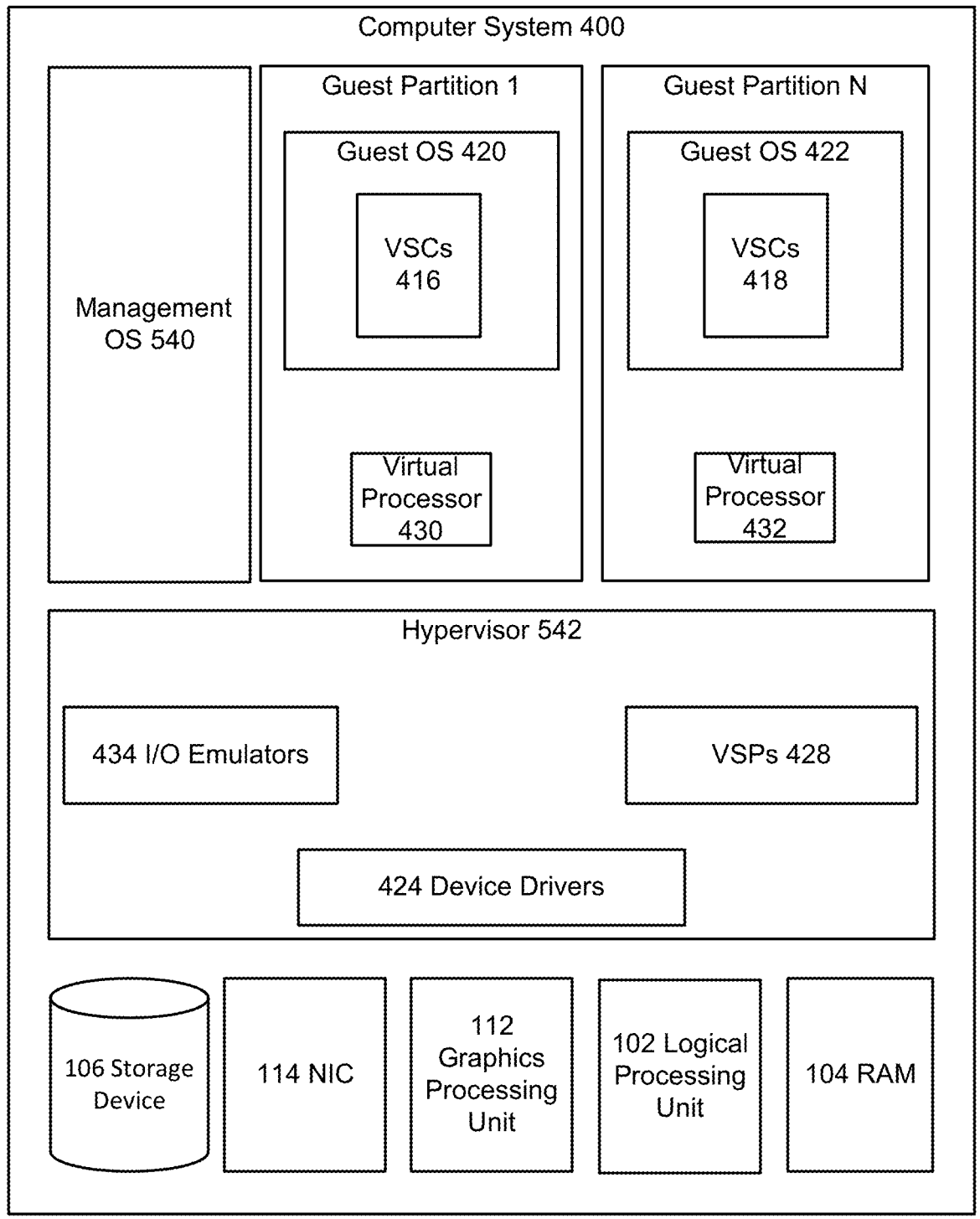
FIG. 5 depicts another example virtual machine environment, with a plurality of virtual machines.

FIG. 5 depicts similar components to those of FIG. 4. However, in this example embodiment hypervisor 542 can include a microkernel component and components similar to those in host 404 of FIG. 4 such as the virtualization service providers 428 and device drivers 424, while management operating system 540 may contain, for example, configuration utilities used to configure hypervisor 542. In this architecture, hypervisor 542 can perform the same or similar functions as hypervisor microkernel 402 of FIG. 4 and host 404. Hypervisor 542 can be a standalone software product, a part of an operating system, embedded within firmware of a motherboard, and/or a portion of hypervisor 542 can be effectuated by specialized integrated circuits.

Figure 6:
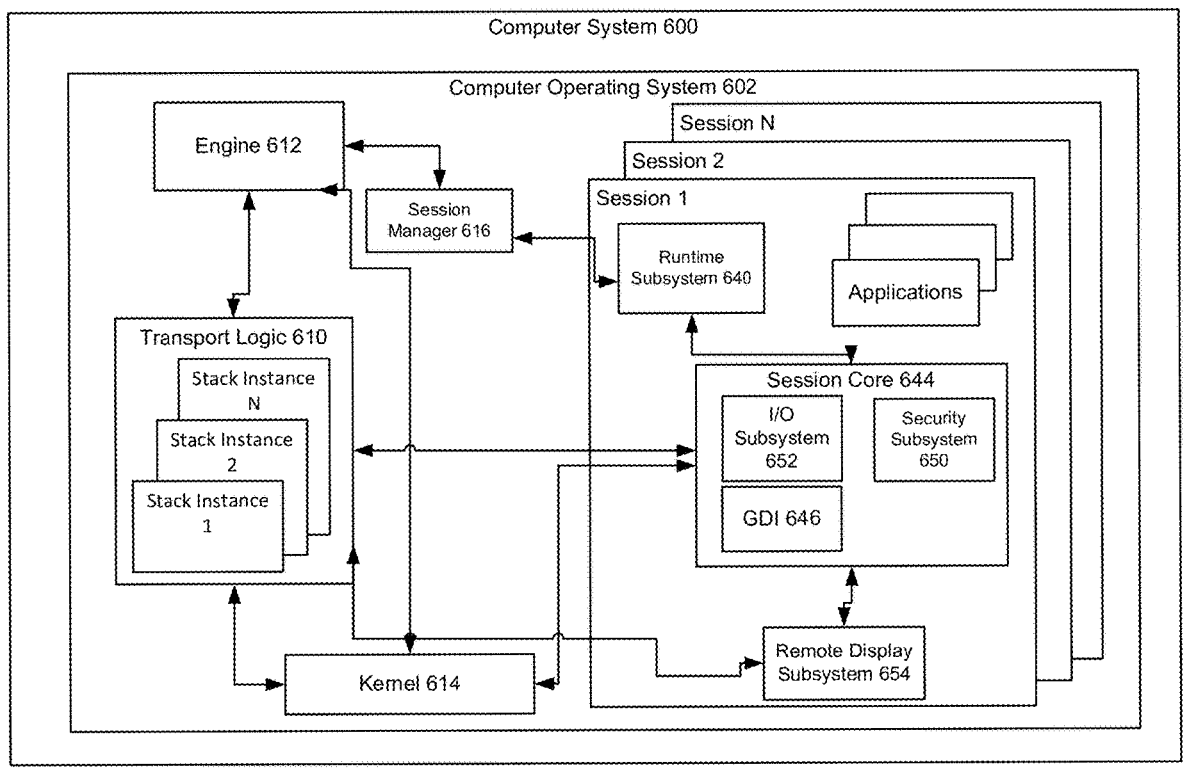
FIG. 6 depicts a remote server hosting a plurality of virtual desktop sessions for practicing aspects of the present disclosure.

In various embodiments, a remote server computer, such as the remote server computer 220 of FIG. 2, can execute multiple remote client sessions or virtual desktops. Each remote client session, such as the remote client session 222, can represent an application environment for a connecting client. A remote server computer can generate at least one remote client session for each of the connecting remote client computers as illustrated in FIG. 6. Moreover, as noted above, the remote server computer 220 may be a virtual machine executing some or all of the components of computer system 400 of FIGS. 4 and 5 that, in turn, executes multiple remote client sessions.

Depicted in FIG. 6 is computer system 600, which may include circuitry configured to effectuate a remote server computer, or in other embodiments the computer system 600 can include circuitry configured to support remote desktop connections. In the depicted example, the computer system 600 can be configured to generate one or more remote client sessions for connecting clients such as sessions 1 through N (where N is an integer greater than 2). Briefly, a session in example embodiments of the present invention can generally include an operational environment that is effectuated by a plurality of subsystems, e.g., software code, that are configured to interact with a kernel 614 of computer system 600. For example, a session can include a process that instantiates a user interface such as a desktop window, the subsystems that track mouse movement within the window, the subsystems that translate a mouse click on an icon into commands that effectuate an instance of a program, etc. A session can be generated by the computer system 600 on a user by user basis by the computer system 600 when, for example, the computer system 600 receives a connection request over a network connection from a client, such as the remote client computer 210 of FIG. 2. Generally, a connection request can first be handled by the transport logic 610 that can, for example, be effectuated by circuitry of the computer system 600. The transport logic 610 can in some embodiments include a network adaptor; firmware, and software that can be configured to receive connection messages and forward them to the engine 612. As illustrated by FIG. 6, the transport logic 610 can in some embodiments include protocol stack instances for each session. Generally, each protocol stack instance can be configured to route user interface output to a client and route user input received from the client to the session core 644 associated with its session.

Continuing with the general description of FIG. 6, the engine 612 in some example embodiments of the present invention can be configured to process requests for sessions; determine the functionality for each session; generate sessions by allocating a set of physical resources for the session; and instantiating a protocol stack instance for the session. In some embodiments the engine 612 can be effectuated by specialized circuitry components that can implement some of the above mentioned operational procedures. For example, the circuitry in some example embodiments can include memory and a processor that is configured to execute code that effectuates the engine 612. As depicted by FIG. 6, in some instances the engine 612 can receive connection requests and determine that, for example, a license is available and a session can be generated for the request. In the situation where the computer system 600 is a remote computer that includes remote desktop capabilities, the engine 612 can be configured to generate a session in response to a connection request without checking for a license. As illustrated by FIG. 6, a session manager 616 can be configured to receive a message from an engine 612 and in response to the message the session manager 616 can add a session identifier to a table; assign memory to the session identifier; and generate system environment variables and instances of subsystem processes in memory assigned to the session identifier.

As illustrated by FIG. 6, the session manager 616 can instantiate environment subsystems such as a runtime subsystem 640 that can include a kernel mode part such as the session core 644. For example, the environment subsystems in an embodiment are configured to expose some subset of services to application programs and provide an access point to the kernel of the computer operating system 602. In example embodiments the runtime subsystem 640 can control the execution of processes and threads and the session core 644 can send requests to the executive of the kernel 614 to allocate memory for the threads and schedule time for them to be executed. In an embodiment the session core 644 can include a graphics display interface 646 (GDI), a security subsystem 650, and an input subsystem 652. The input subsystem 652 can in these embodiments be configured to receive user input from a client via the protocol stack instance associated with the session and transmit the input to the session core 644 for the appropriate session. The user input can in some embodiments include signals indicative of absolute and/or relative mouse movement commands, mouse coordinates, mouse clicks, keyboard signals, joystick movement signals, etc. User input, for example, a mouse double-click on an icon, can be received by the session core 644 and the input subsystem 652 can be configured to determine that an icon is located at the coordinates associated with the double-click. The input subsystem 652 can then be configured to send a notification to the runtime subsystem 640 that can execute a process for the application associated with the icon.

In addition to receiving input from a client, draw commands can be received from applications and/or a desktop and be processed by the GDI 646. The GDI 646 in general can include a process that can generate graphical object draw commands. The GDI 646 in this example embodiment can be configured to pass The GDI 646 output to the remote display subsystem 654 where the commands are formatted for the display driver that is attached to the session. In certain example embodiments, one or more physical displays can be attached to the computer system 600, e.g., in a remote desktop situation. In these example embodiments, the remote display subsystem 654 can be configured to mirror the draw commands that are rendered by the display driver(s) of the remote computer system and transmit the mirrored information to the client via a stack instance associated with the session. In another example embodiment, the remote display subsystem 654 can be configured to include virtual display driver(s) that may not be associated with displays physically attached to the computer system 600, e.g., the computer system 600 could be running headless. The remote display subsystem 654 in this embodiment can be configured to receive draw commands for one or more virtual displays and transmit them to the client via a stack instance associated with the session. In an embodiment of the present invention, the remote display subsystem 654 can be configured to determine the display resolution for each display driver, e.g., determine the display resolution of the virtual display driver(s) associated with virtual displays or the display resolution of the display drivers associated with physical displays; and route the packets to the client via the associated protocol stack instance.

In some example embodiments, the session manager 616 can additionally instantiate an instance of a logon process associated with the session identifier of the session that can be configured to handle logon and logoff for the session. In these example embodiments drawing commands indicative of the graphical user interface associated with the logon process can be transmitted to the client where a user of the client can input an account identifier, e.g., a username/password combination, a smart card identifier, and/or biometric information into a logon screen. The information can be transmitted to computer system 600 and routed to the engine 612 and the security subsystem 650 of the session core 644. For example, in certain example embodiments the engine 612 can be configured to determine whether the user account is associated with a license; and the security subsystem 650 can be configured to generate a security token for the session.

As described by FIG. 6, a remote server computer can provide multiple remote desktop sessions to connecting remote client computers. The remote desktop sessions may be associated with one or more applications requested by a remote client computer. Additionally and as described by FIG. 6, the remote server computer can process the graphics data representative of a client desktop, such as a user interface screen, a user input commands, etc. Further, the remote server computer may render, capture, compress, and transmit the graphics data to the client remote computer. Rendering refers to the process of translating raw display calls, such as rotate, flip, and draw, made by the applications running within the remote desktop sessions. Capturing refers to the process of taking a rendered application content, such as on-screen bitmaps or frame changes, and intelligently capturing the change over a previous rendering of the application content. Compressing, also referred to as encoding, refers to the process of optimally and equitably delivering graphics resources to the each of the connected remote client computer. The quality of network conditions and target remote client computer determine the type of compression/encoding used to optimally deliver captured content.

As will be described herein below, in various embodiments, the remote server computer may comprise a compute server and a graphics server. The compute serve can be configured to receive graphics data from a remote client computer, process the graphics data, and send the processed graphics data to the graphics server. The graphics server can be configured to render, capture, and compress the received data from the compute server into graphics output data. Rather than sending the graphics output data to the compute server and using the compute server to transmit the graphics output data to the remote client computer, the graphics server may also be configured to transmit directly the graphics output data to the remote client computer.

Figure 7:
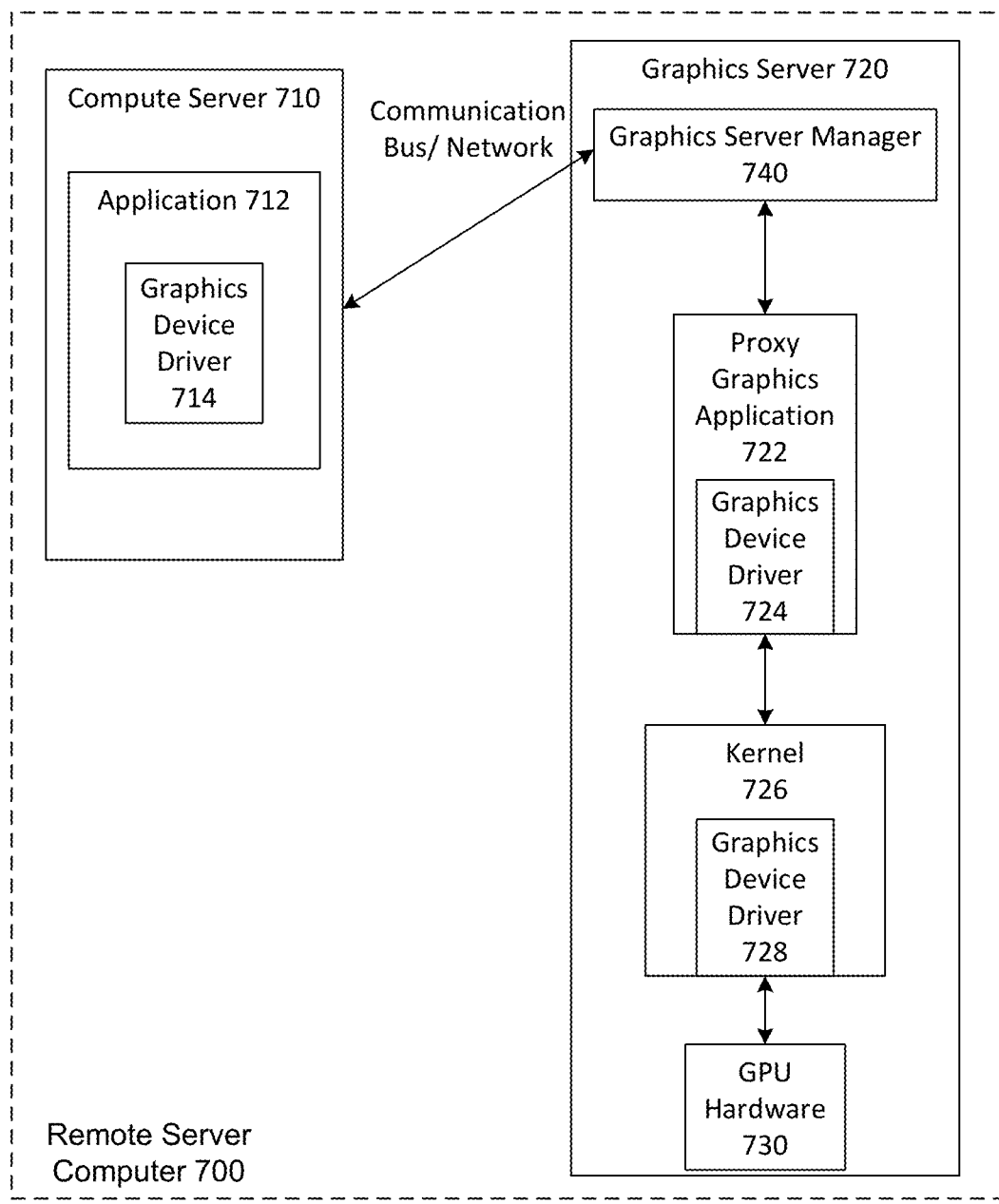
FIG. 7 depicts an example compute server and graphics server architecture for practicing aspects of the present disclosure.

FIG. 7 depicts an example embodiment of a remote server computer 700 comprising a compute server 710 and graphics server 720. Embodiments of the remote server computer 700 may execute some or all of the components described with respect to computer 100 of FIG. 1, remote server computer 220 of FIG. 2, remote server computer 320 of FIG. 3, computer system 400 of FIGS. 4 and 5, and computer system 600 of FIG. 6.

Embodiments of the compute server 710 may execute some or all of the components described with respect to computer 100 of FIG. 1, remote server computer 220 of FIG. 2, computer system 400 or virtual machine 440 of FIGS. 4 and 5, and computer system 600 of FIG. 6. The compute server 710 may also have insufficient or no GPU resources. In a further embodiment, the compute server 710 may be a standard server computer configured appropriately for providing the computing resources described below. In another embodiment, the compute server 710 may be a computing device configured for specific functions. For example, a compute server may have a single type of processing unit and a small amount of cache memory only.

The graphics server 720 may be configured to provide resources for graphics operations, such as rendering, capturing, and compressing operations. The graphics server may also be configured with a plurality of GPU resources. In an embodiment, the graphics server 720 may execute some or all of the components described with respect to computer 100 of FIG. 1. In a further embodiment, the graphics server may be hosted on a host partition, such as host 404 of FIG. 4. The compute server 710 and the graphics server 720 may be connected via a network (fiber channel, LAN, wireless, Ethernet, etc.). In a virtualized environment such as the environment of FIG. 4, the graphics server 720 and the compute server 710 may also be connected using a VMBus.

The compute server 710 may run one or more applications 712. In one aspect the application may be associated with a graphics device driver 714. The graphics device driver 714, the application 712, and/or the compute server 710 may be associated with a graphics server manager 740 on the graphics server 720. The graphics device driver 714, the application 712, and/or the compute server 710 may be able to send and receive instructions and data to and from the graphics server manager 740. As one example, the graphics device driver 714, the application 712, and/or the compute server 710 may be able to send first data to the graphics server manager 740, the first data indicative of a request for GPU resources. The graphics server manager 740 may send second data to the graphics device driver 714, the application 712, and/or the compute server 710, the second data indicating routing for GPU instructions from the graphics server 720.

The graphics server manager 740 may manage the graphics server 720. The graphics server manager 740 may be able to send instructions and data to components of the graphics server 720 and may receive information and data as a response from components of the graphics server 720. The graphics server 720 may be specialized for GPU hosting and processing. The graphic server 720 may comprise the graphics server manager 740, a proxy graphics application 722, a kernel 726, and GPU hardware 730. The proxy graphics application 722 may be associated with a first graphics device driver 724, and the kernel 726 may be associated with a second graphics device driver 728. The graphics device driver 724 and 728 may translate, receive, and send data and information associated with graphics processing tasks. In one embodiment, the graphics device driver 724 and 728 are selected to translate between particular GPU hardware 730 and the applications, hardware, and operating systems on the graphics server manager 740, the compute server 710, and/or a remote client computer.

Figure 8:
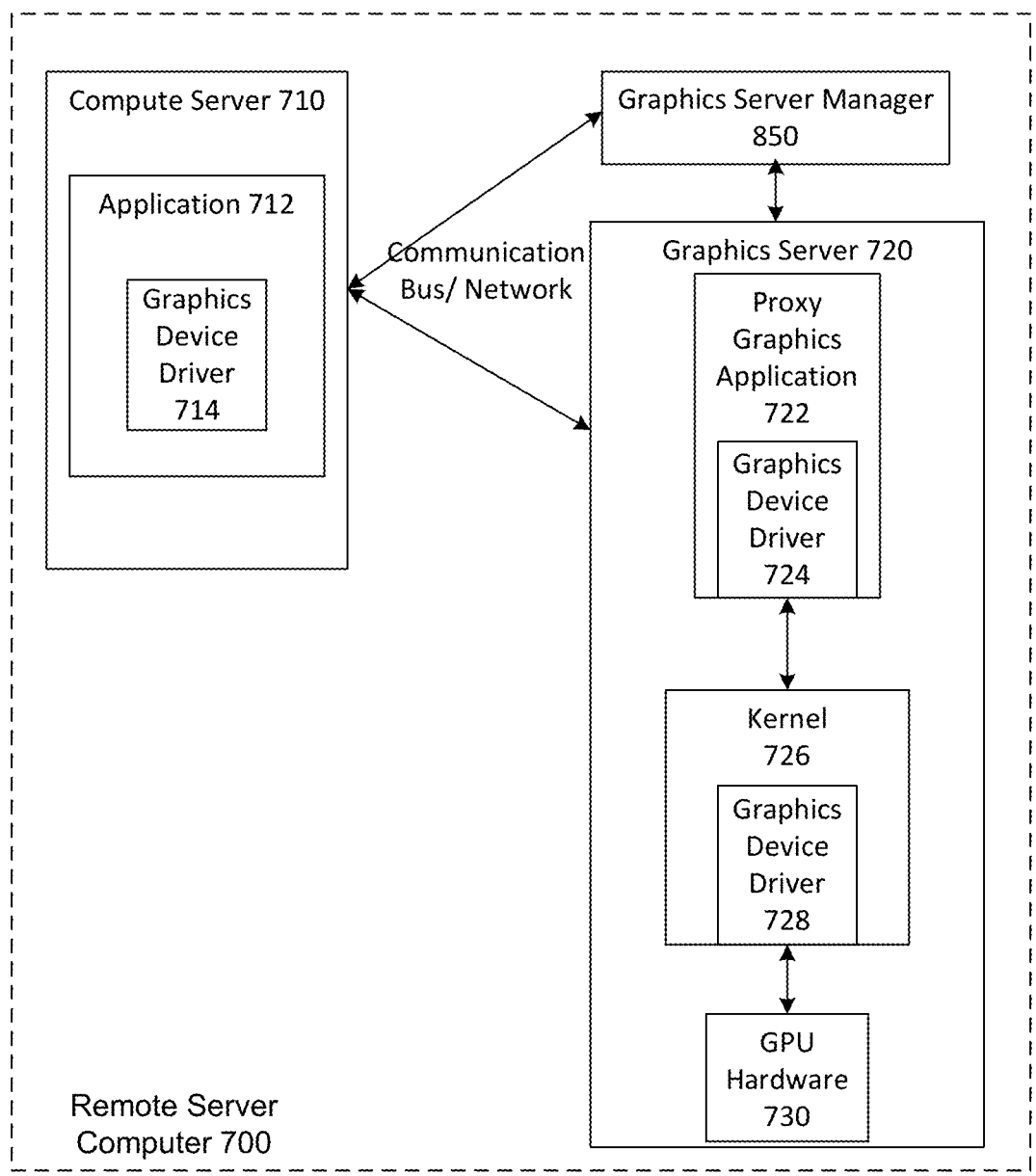
FIG. 8 depicts another example compute server and graphics server architecture for practicing aspects of the present disclosure.

In the embodiment of FIG. 7, instructions associated with graphics processing tasks can flow through a series of layers, from the application 712 to the graphics server manager 740, to the proxy graphics application 722, to the Kernel 726, to the hardware 730. The processed information may follow the same path in reverse. FIG. 8 illustrates an alternative embodiment for the information path. The graphic server manager 850 receives a request for GPU resources from the compute server 710, the application 712, and/or the graphics device driver 714, and sends routing instructions, state instructions, and the like to the compute server 710 and the graphics server 720. Thereafter, GPU tasks, processed information, and instructions may be sent directly between the graphics server 720 and the compute server 710. The graphics server manager 850 may monitor the interactions and may perform other tasks related to the allocation of resources on a GPU such as GPU hardware 730.

Figure 9:
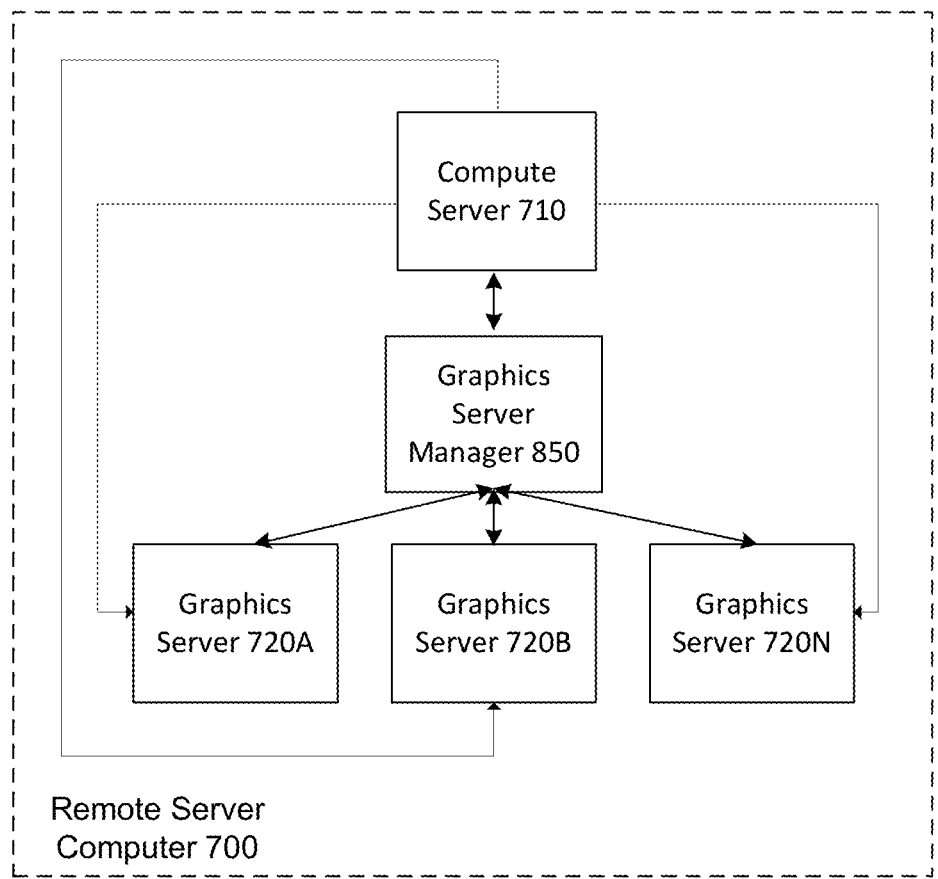
FIG. 9 depicts an example compute server and plurality of graphics servers for practicing aspects of the present disclosure.

FIG. 9 depicts a plurality of graphics servers 720(A-N), which may be used when resources associated with a single set of GPU hardware 730 are insufficient to perform a GPU processing task. This embodiment may also be used when a graphics server manager 850 migrates a part of a GPU processing task from a first graphics server 720A to a second graphics server 720B. In such an embodiment, the graphics server manager 850 may act to copy the state of the first graphics server 720A to the second graphics server 720B.

Figure 10:
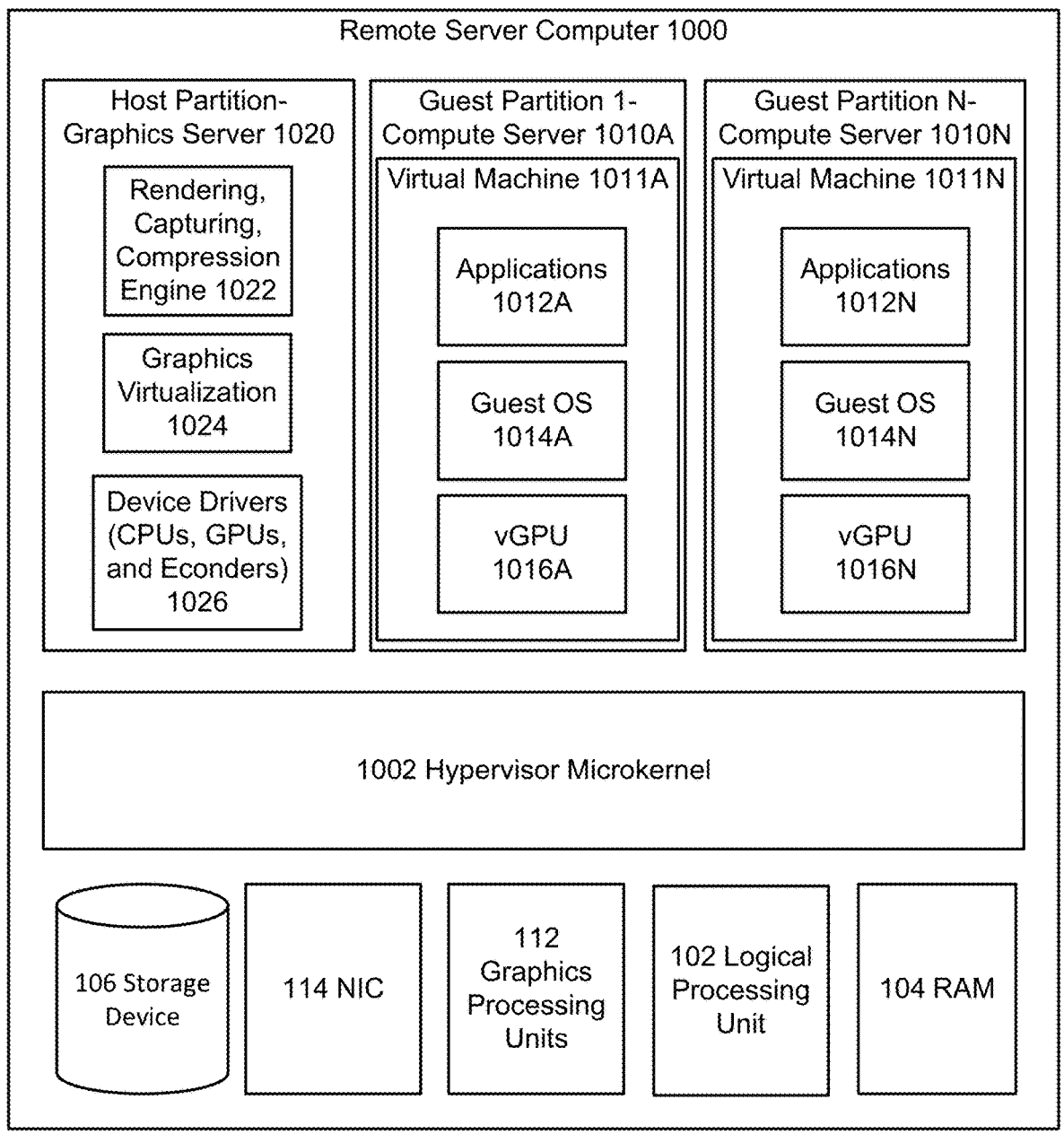
FIG. 10 depicts an example compute server and graphics server effectuated in a virtual environment for practicing aspects of the present disclosure.

FIG. 10 depicts an example embodiment of a remote server computer 1000 with a compute server 1010 and a graphics server 1020 implemented in a virtualized environment or a virtual desktop infrastructure (VDI). The compute server 1010 and the graphics server 1020 can be configured to effectuate the compute server 710 and graphics server 720 of FIGS. 7-9. Embodiments of the remote server computer 1000 may execute some or all of the components described with respect to computer 100 of FIG. 1, remote server computer 220 of FIG. 2, remote server system 350 of FIG. 3, computer system 400 of FIGS. 4 and 5, and computer system 600 of FIG. 6.

FIG. 10 depicts a host-based graphics virtualization for VDI. Such architecture can, for example, be implemented using the Microsoft® RemoteFX® platform. Virtual machines 1011(A-N) can be referred to as virtual desktops. The architectures uses virtual graphics processing unit (vGPU) 1016(A-N), which abstracts the relationship between guest operating system (OS) 1014(A-N) and physical GPU 112 to optimally share GPU resources in a hosted multi-user environment.

The hypervisor microkernel 1002 can be configured to effectuate a plurality of host and guest partitions. In a further embodiment, the hypervisor microkernel 1002 can integrate remote desktop session components (not shown).

Each host partition can be configured as a graphics server 1020 that has access to physical GPU resources of the remote computer server 1000. Each host partition can also include management components for graphics rendering, capturing, and encoding. Each host partition can also include device drivers 1026 that provide an interface to physical GPUs 112 and to host-based encoders, such as ASICS (not shown). The device drivers 1026 can include GPU, CPU, and encoder specific drivers.

Each guest partition can be configured as a compute server 1010 that has access to vGPU resources. Each guest partition can effectuate one or more virtual desktops or sessions for a plurality of connected remote client computers (not shown). The connection between each guest partition and the remote client computers can comprise a remote desktop session, such as RDP 7.1, similar to what is shown in FIGS. 2-3.

The vGPU 1016 can provide a virtual graphics adapter installed in each virtual machine 1011. The vGPU 1016 can abstract graphic processing for multiple virtual machines utilizing one or more GPUs 112. When an application running in the virtual machine 1011 invokes a graphics operation, such as a DirectX® or a GDI operation, the vGPU 1016 can use a communications channel between the guest partition 1010 and the host partition 1020 to obtain resources from the GPUs 112. The communication channel can comprise a VMBus or a TCP/IP channel. The VMBus can be configured within the hypervisor microkernel 1002 for memory sharing and other functions specific to the vGPU. Such VMBus configuration can provide an integration mechanism directly into the hypervisor microkernel 1002, where all resource requests for graphics-related devices can be transferred.

The vGPU 1016 can also provide a quality of service mechanism to virtual machines 1011. The quality of service mechanism can equitably deliver GPU 112 resources to the virtual machines 1011 based on load-balancing policies that make most efficient use of the GPU 112.

The host partition 1020 can be configured to provide remote desktop virtual graphics management (RDVGM) functions to the virtual machines 1011. The RDVGM can manage resource assignment and process control between physical resources of the remote computer server 1000 and vGPU 1016 resource assignment into each virtual machine guest operating system (OS) 1014. The RDVGM functions can include: managing the rendering, capturing, and compressing (RCC) processes, assigning GPU 112 resources to virtual machines 1011 through the vGPU 1016, assigning resource policies to virtual machines 1011, and load-balancing GPU 112 resources across multiple virtual machines 1011(A-N). The RDVGM can also assign appropriate GPU 112 resources to virtual machines 1011(A-N) at boot time.

The RDVGM can integrate an RCC engine 1022, which handles rendering, capturing, and compressing of graphics data. The RCC can receive graphics requests as output from each virtual machine 1011, and translate these requests into, for example, DirectX® compliant commands on the host partition 1020. A VMBus can provide a high-speed communications backplane for graphics requests from hosted applications 1012(A-N) running in the virtual machines 1011(A-N) to physical GPU 112 resources. For DirectX® compliant commands, applications 1012(A-N) need to support DirectX® 9 or later while GPUs 112 need to support DirectX® 10 or later.

As previously described, rendering refers to the process of translating raw display calls such as rotate, flip, and draw, made by the applications 1012(A-N) through the vGPUs 1016(A-N), honoring those requests to the GPUs 112, and thus rendering application content. The rendering can be based on standard DirectX® syntax. Capturing refers to the process of taking rendered application content, such as on-screen bitmap or frame changes, and intelligently capturing the change over a previous rendering of the application content. A secondary function of capturing is assigning quality of service policies for capture quality and encoding level. Compressing or encoding refers to the process of optimally and equitably delivering GPU 112 resources through the vGPU 1016 to remote client computers over communication channels comprising, for example, a remote desktop session protocol. The quality and condition of the communication channel and the type of the targeted remote client computer can determine the type of compression/encoding used to optimally deliver the captured content.

When an application 1012 running within a VM 1011 issues display calls such as draw, resize, and rotate, the vGPU 1016 can broker all rendering requests. The virtualization path can be transparent to the guest OS 1014. As previously explained, the graphics processing commands can be intercepted by the host partition 1020. The interception can be done at a low level in the software stack. The graphics can then be rendered on the GPUs 112 into a single frame buffer, which serves as a temporary holding station for graphical updates. The frame buffer can represent the virtualized display of an end-user; the end-user being a connected user to the virtual machine 1011 using a remote client computer. Rich graphics applications, 3D plug-ins, and other graphics calls and commands can run exactly as if the applications were running on a dedicated workstation containing GPUs.

The host partition 1020 can rapidly and efficiently capture the rendered content. Each frame within the content can be divided into manageable units. Change regions within the frame can be processed through an optimization capability provided by the RCC engine 1022. Through this capturing mechanism, individual frames are intercepted for display changes. Only the regions within a frame that have changed are captured for encoding.

The host partition 1020 can also compress the captured content. The compression process can be controlled through administrative tools, giving certain virtual machines higher or lower priority, or the compression process can be controlled dynamically by the size of the change regions within a captured frame. In addition, in an embodiment that uses a remote desktop session, such as RDP 7.1, the remote desktop session can provide frame-rate optimization based on network usage and fairness. The RCC engine 1022 can reach out to a remote desktop session listener process to assess the state of a remote client computer, including the remote client computer decoding capabilities. Changes to the frame buffer can be sent to the remote client computer at a frame rate that dynamically adapts to network conditions and the remote client computer's ability to consume the changes. The encoded output can be tunneled within the remote desktop session and can be sent out to the remote client computer.

All the architecture variations shown in FIGS. 7-10 for implementing a remote server computer comprising one or more compute servers and one or more graphics servers are exemplary implementations. Nothing herein should be interpreted as limiting the disclosure to any particular implementation aspect.

In a remote computing environment, a remote client computer typically communicates with the compute server only and does not have a direct connection with the graphics server. The communication with the compute server can comprise using a redirector and/or a broker similar to what is shown in FIG. 3. The compute server typically manages the connection with the remote client computer. For example, the guest operating system of the compute server can be configured to authenticate the client. Once authentication is complete, data transfer between the remote client computer and the compute server can be initiated. As such, graphics request from the remote client computer can be received by the compute server. The compute server can process the graphics request into graphics calls and commands and transmit these calls and commands to the graphics server for rendering, capturing, and compression. Because the graphics server does not have a direct communication path with the remote client computer, graphics output from the graphics server can be sent to the compute server. The compute server can package and transmit the graphics output to the remote client computer for display to an end-user.

Applying the above description in the virtual environment of FIG. 10, graphics requests from a remote client computer are transmitted over a physical NIC 114 of a remote server computer 1000, though a virtual NIC (not shown) of a guest partition 1010, to an application 1012. The graphics request can then be processed and routed to a host partition 1020 for rendering, capturing, and compressing. Once rendered, captured, and compressed, the output data can be routed back from the host partition 1020 to the compute server 1010 using the vGPU 1016. To transmit the output data from the guest partition 1010 to the remote client computer, the guest partition 1010 can package and transmit the data using the virtual NIC. The virtual NIC can redirect the output data to the physical NIC 114 that transmits the data over the network to the remote client computer. As described, the repetitive data traversal between the guest partition 1010, the host partition 1020, and the underlying resources of the remote sever computer 1000 can require intensive operations and can consume significant amount of memory and CPU resources that can increase the data delivery latency to the remote client computer.

Figure 11:
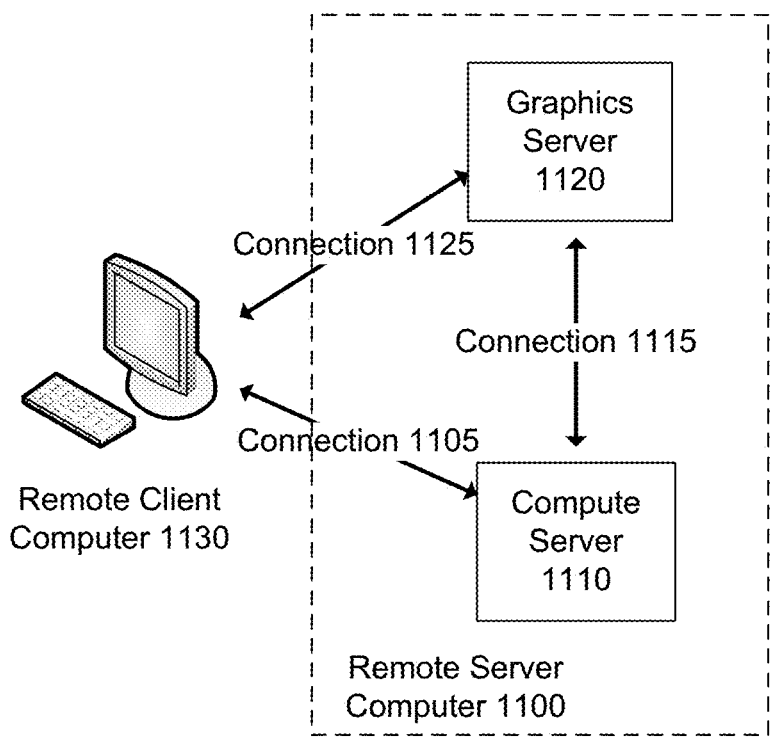
FIG. 11 depicts a computing environment with a client, compute server, and graphics server for practicing aspects of the present disclosure.

FIG. 11 illustrates an alternative architecture that eliminates the repetitive data traversal between the resources of a remote server computer 1100. FIG. 11 describes an architecture that retains in a compute server 1110 the management of the connection with the remote client computer 1130 and that enables a graphics server 1120 to stream graphics output data directly to the remote client computer 1130. Embodiments of the remote server computer 1100 may execute some or all of the components described with respect to remote server computer 700 of FIGS. 7-9 and remote server computer 1000 of FIG. 10. Embodiments of the remote client computer 1130 may execute some or all of the components described with respect to computer 100 of FIG. 1, remote client computer 210 of FIG. 2, and remote client computer 310 of FIG. 3.

The remote client computer 1130 can initiate a connection 1105 over a network (not shown) with the compute server 1110. The connection 1105 can be TCPI/IP based and can comprise a remote desktop session, such as RDP 7.1. The compute server 1110 can authenticate the connection 1105 with the remote client computer 1130. The authentication method can require the remote client computer 1130 to be authenticated before a virtual desktop or session for the remote client computer 1130 is set-up in the compute server 1110. The authentication method can be, for example, a network level authentication available in RDP 7.1. Additionally, the compute server 1110 can acquire an address such as an IP address of the remote client computer 1130.

Once the authentication is complete and the connection 1105 between the remote client computer 1130 and the compute server 1110 is established, the compute server 1110 can initiate a remote desktop session, a virtual machine, a desktop session within a virtual machine, or a combination thereof running within the compute server 1110 for the remote client computer 1130. Such virtual machine or desktop session can embody the techniques of FIGS. 2-10. Additionally, the compute server 1110 can initialize the graphics server 1120. The initialization can comprise, for example, restoring or waking-up the graphics server 1120 if the graphics server is in an inactive state and establishing a connection 1115 between the compute server 1110 and the graphics server 1120. The connection 1115 can be TCP/IP based or can use a VMBus in a virtual environment. The compute server 1110 can also provide the remote client computer 1130 address to the graphics server 1120 and instruct the graphics server 1120 to prepare for a connection request originating from the remote client computer 1130 address. The compute server can also acquire an address, such as an IP address, of the graphics server 1120 and can provide the graphics server 1120 address to the remote client computer 1130.

Once the graphics server 1120 is initialized and the remote client computer 1130 acquires the graphics server 1120 address, client computer 1130 can initiate a connection 1125 over a network (not shown) with the graphics server 1120. The connection 1125 can be TCP/IP based. The connection 1125 can also comprise a remote desktop session, such as RDP 7.1. In a further embodiment, if the connection 1105 and the connection 1125 comprise a remote desktop sessions, the remote desktop sessions can be separate or can be the same across the connection 1105 and the connection 1125.

Once the connections 1105, 1115, and 1125 are established, the remote client computer 1130 can send an end-user graphics input, such as keyboard or mouse input, to the compute server 1110. The computer server can process the graphics input using the techniques of FIGS. 2, 6-10. In one embodiment, the compute server 1110 can translate an end-user keyboard strike or a mouse click on an icon into display commands that effectuate an instance of an application and into display calls such as rotate, flip, resize, and draw. The compute server 1110 can send the display commands and calls data to the graphics server 1120 for rendering, capturing, and compressing. The graphics server 1120 can render, capture, and compress the display commands and calls data and encode the output as output graphics data. Instead of sending the output graphics data to the compute server 1110, the graphics sever 1120 can transmit the output graphics data directly to the remote client computer 1130 over the connection 1125. The remote client computer 1130 can decode the output graphics data for display to an end-user.

In an embodiment, where the remote server computer 1100 is virtualized, such as remote server computer 1000 of FIG. 10, the compute server 1110 can be effectuated on a guest partition and the graphics server 1120 can be effectuated on a host partition. Each partition can be configured to have an address, such as an IP address. The address of the guest partition or the computer server 1110 can be associated with a virtual NIC. The address of the host partition or the graphics server 1120 can be associated with a virtual NIC or with a physical NIC 114 of the underlying hardware of the remote server computer 1100. The compute server 1110 can present a virtual machine or a session running therein to the remote client computer 1130. The connection 1115 between the compute server 1110 and the graphics server 1120 can comprise an intra-partition communication channel, such as a VMBus.

Graphics data such as an end-user input at the remote client computer 1130 can be sent from the remote client computer 1130 over the connection 1105 to the compute server 1110 address associated with the computer server 1110 virtual NIC.

The compute server 1110 can process the received graphics data into display commands and calls data as previously described. The compute server 1110 can send the processed graphics data to the graphics server 1120 for rendering, capturing, and compressing. In an embodiment, the sending of the processed data can comprise transmitting the processed data from the memory space allocated to the compute server 1110 to the memory space allocated to the graphics server 1120. In another embodiment, partitions within the remote server computer 1100 can share memory space. In such embodiment, the sending of the data from the compute server 1110 to the graphics server 1120 can comprise routing an address of a memory space containing the processed data rather than copying the processed data between two memory spaces. For example, the compute server 1110 and the graphics server 1120 can take advantage of the shared memory space within a VMBus to route the processed data.

The graphics server 1120 can render, capture, and compress the processed data as previously described. The graphics server 1120 can encode the rendered, captured, and compressed data into an output data and can transmit the output data using the graphics server NIC to the address associated with the remote client computer 1130. The remote client computer 1130 can decode the received output data for display to an end-user.

Figure 12:
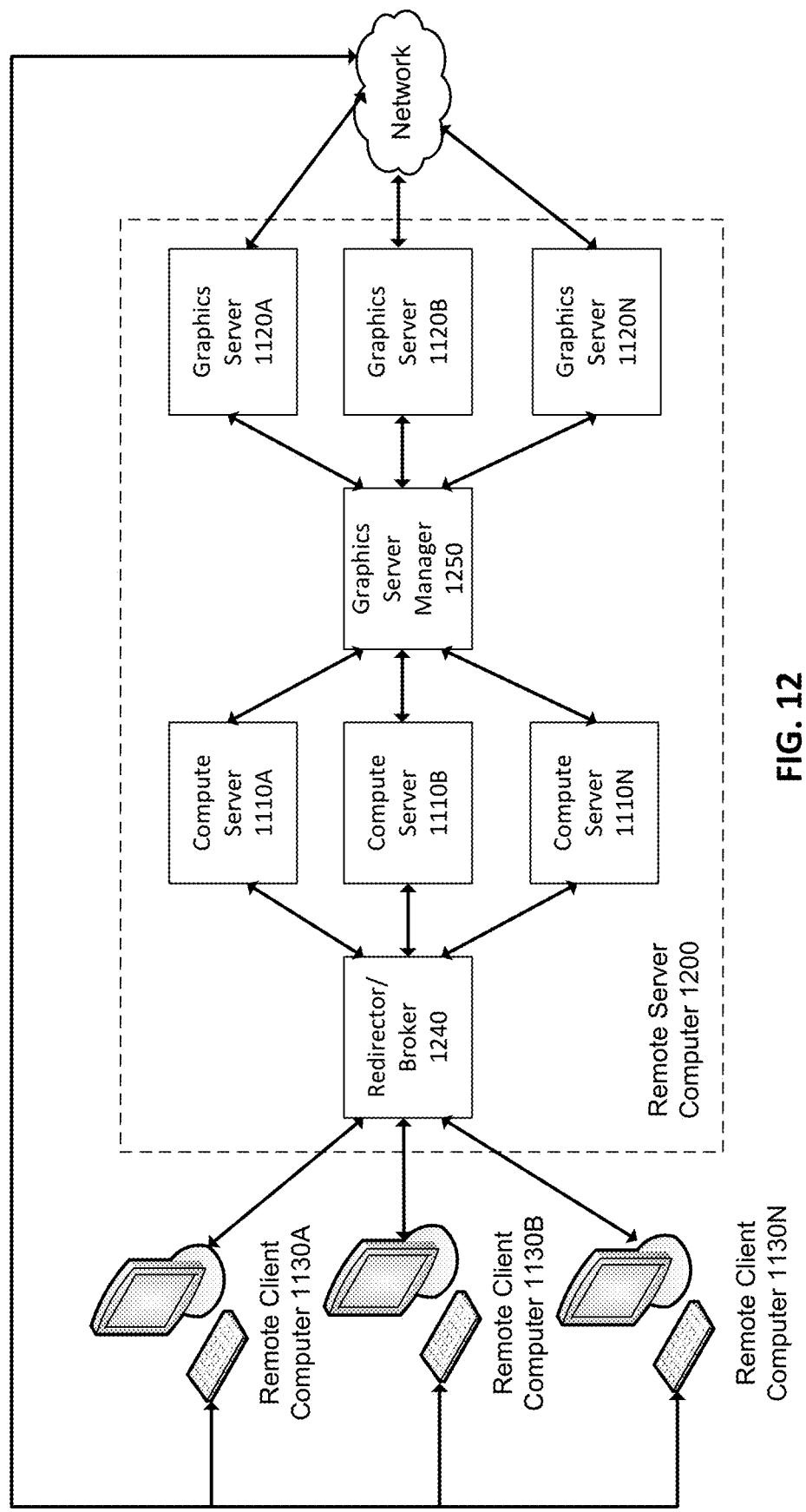
FIG. 12 depicts a computing environment with a plurality of clients, compute servers, and graphics servers for practicing aspects of the present disclosure.

FIG. 12 depicts an embodiment of the architecture of FIG. 11 in an environment comprising a plurality of remote client computers 1130(A-N), a plurality of compute servers 1110(A-N), and a plurality of graphics servers 1120(A-N). It is important to note that the numbers of remote client computers, compute servers, and graphic servers need not be equal. In other words, the relationships between remote client computer 1130(A-N) and compute servers 1110(A-N), compute servers 1110(A-N) and graphics servers 1120(A-N), and graphics servers 1120(A-N) and remote client computer 1130(A-N) can be one-to-one, one-to-many, or a combination thereof.

Embodiments of the remote server computer 1200 may execute some or all of the components described with respect to remote server computer 220 of FIG. 2, remote server computer 320 of FIG. 3, remote server computer 700 of FIGS. 7-10, remote server computer 1000 of FIG. 10, and remote server computer 1100 of FIG. 11. In one embodiment, the remote server computer 1200 can comprise a plurality of physical computing systems. Redirector and broker 1240 may execute some or all of the components described with respect to redirector 330 and broker 340 of FIG. 3. Graphics server manager 1250 may execute some or all of the components described with respect to graphics server manager 740 of FIG. 7, and graphics server manager 850 of FIGS. 8-9. Additionally, the redirector and broker 1240 can be integrated with the compute servers 1110(A-N). Similarly, the graphics server manager 1250 can be integrated with the graphics servers 1120(A-N). In another embodiment, the remote server computer may be virtualized and may execute some or all of the components described with respect to computer system 400 of FIGS. 4-5, remote server computer 1000 of FIG. 10, and remote server computer 1100 of FIG. 11. In such embodiment, compute servers 1110(A-N) can be effectuated on one or more guest partitions and graphics servers 1120(A-B) can be effectuated on one or more host partitions. The redirector and broker 1240 and the graphics server manager 1250 can also be virtualized in one or more guest partition and/or one or more host partition using the techniques previously described. In a further embodiment, the remote server computer 1200 can be a combination of virtual and physical machines. For example, the compute servers 1110(A-N) and graphics servers 1120(A-N) may be virtualized while the redirector and broker 12040 and graphics server manager 1250 may be physical computing devices.

The redirector and broker 1240 may be used to establish a first connection between a remote client computer 1130 and a compute server 1110. For example, the redirector and broker 1240 may allocate a compute server 1110 out of the plurality of compute servers 1110(A-N) and/or a session therein to the remote client computer 1130. As such, the redirector and broker 1240 can provide load balancing techniques with respect to the availability of the compute server 1110(A-N). Once that allocation is complete, the allocated compute server 1110 can authenticate the remote client computer 1130. The remote client computer 1130 and the allocated compute server 1110 can establish the first connection as previously described. For example, the first connection can comprise connection 1105 of FIG. 11. The allocated compute server 1110 can also acquire an address of the remote client computer 1130.

The graphics server manager 1250 may be used to establish a second connection between the allocated compute server 1110 and a graphics server 1120 out of the plurality of graphics server 1120(A-N). The graphics server manager 1250 may execute load balancing techniques and determine the availability of the graphics servers 1120(A-N). Accordingly, the graphics server manager 1250 may then allocate a graphics server 1120 to the connection with the allocated computer server 1110. Once the allocation is complete, the second connection can be established. For example, the second connection can comprise connection 1115 of FIG. 11.

The allocated compute server 1110 can provide the address of the remote client computer 1130 to the graphics server 1120 and can acquire and provide the allocated graphics server 1120 address to the remote client computer 1130. The remote client computer 1130 and the allocated graphics server 1120 can establish a third connection using the acquired addresses of the remote client computer 1130 and the allocated graphics server 1120. The third connection can comprise connection 1125 of FIG. 11.

Further, load balancing techniques can be executed on the architecture of FIG. 12. For example, in case of load balancing of graphics servers 1120(A-N), when the allocated graphics server 1120 can no longer serve the remote client computer 1130 properly, the compute server 1110 can establish a new connection with an available graphics server 1120 and instruct the remote client computer 1130 to establish a corresponding new connection with the available graphics server 1120. The remote client computer 1130 can then seamlessly transition over to the available graphics server 1120. Additionally, in case of load balancing of compute servers 1110(A-N), when the allocated compute server 1110 can no longer serve the remote client computer 1130 properly, new connections between the remote client computer 1130 and an available compute server 1110 and between the available compute server 1110 and the already allocated graphics server 1120 can be established, while the connection between the remote client computer 1130 and the already allocated graphics server 1120 can remain the same. Techniques such as virtual machine live migration can seamlessly transfer the workload from one compute 1110 server to another while the graphics server 1120 workloads can remain the same.

In an embodiment, techniques can be used to enable one or more remote client computers 1130 to accept display streams or graphics output data from various graphics servers 1120. For example, a remote client computer 1130A can get permission from other remote client computers 1130(B-N) to view the end-user displays associated with the other remote client computers 1130(B-N). The permission can comprise, for example, the addresses of the various graphics servers 1120 allocated to each of the other remote client computers 1130(B-N). Additionally, the permission can comprise the addresses of the other remote client computers 1130(B-N), the addresses of the compute servers 1110 allocated to the each of the other remote client computers 1130(B-N), the corresponding session IDs, user names, names of the compute servers 1110 and graphics servers 1120, the number of active sessions in each compute server 1110, and so on. The remote client computer 1130A can use the permission to establish connections with the graphics servers 1120 allocated to each of the other remote client computers 1130(B-N). The connections can comprise connection 1125 of FIG. 11. Once the connections are established, the various graphics servers 1120 can transmit the graphics data output of the other remote client computers 1130(B-N) to the remote client computer 1130A. The remote client computer 1130A can decode the graphics output data received from the various graphics servers 1120 and can display the decoded data to an end-user. For example, the remote client computer 1130A can display the decoded data in a tiled fashion or can allow the end-user to flip through each of screens associated with the other remote client computers 1130(B-N). Further, the remote client computer 1130A can display other information available in the permission, such as user names, names of corresponding compute servers 1110 and graphics servers 1120, and so on. In another embodiment, a graphics server 1120 transmitting various graphics output data corresponding to remote client computers 1130(B-N) can be configured to also transmit the various graphics output data and other information about the corresponding remote client computers 1130(B-N) to another remote client computer 1130A. As such, the remote client computer 1130A can display the screens of and information about the remote client computers 1130(B-N).

Figure 13:
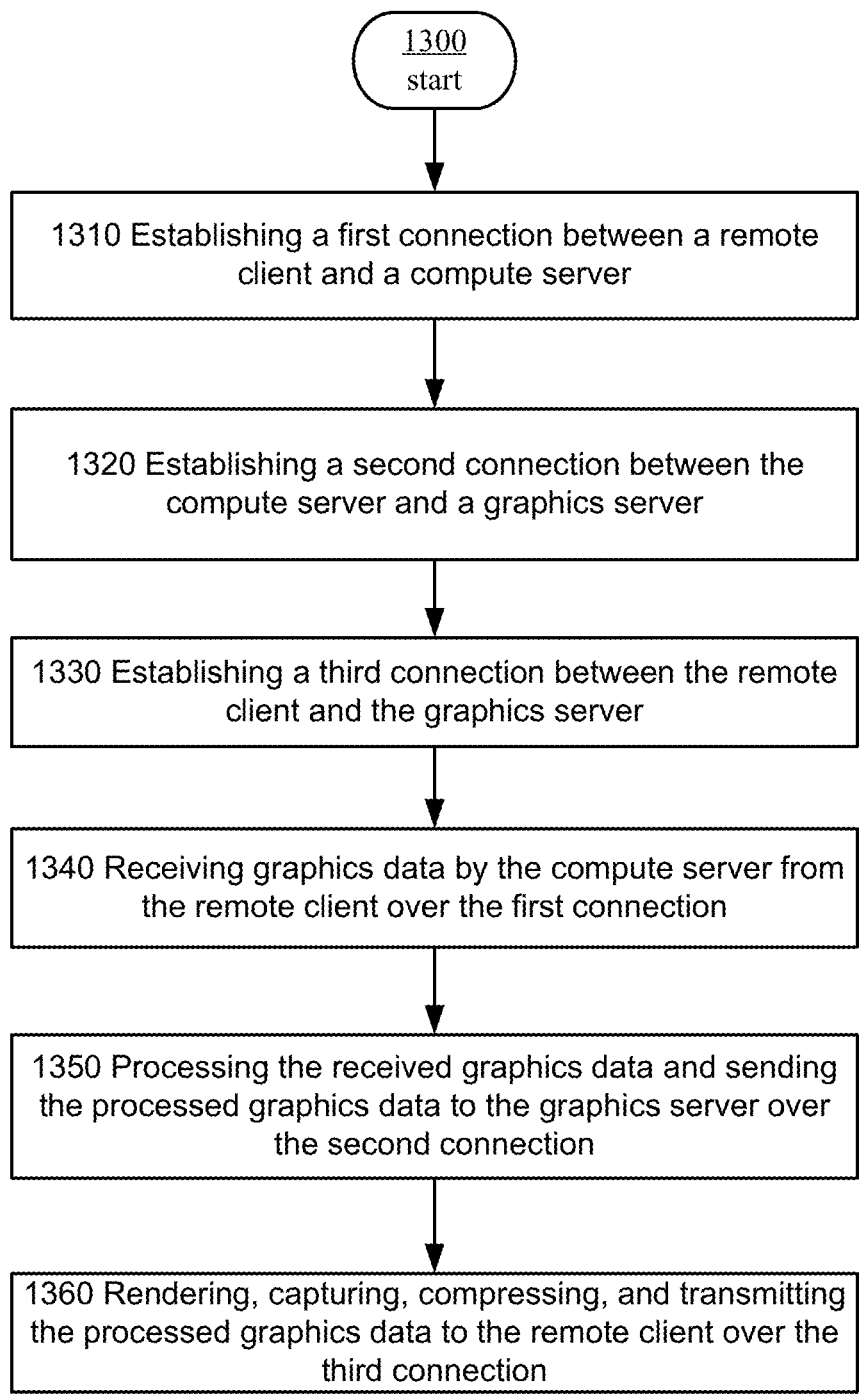
FIG. 13 depicts a flow chart illustrating an example method for practicing aspects of the present disclosure.

FIG. 13 depicts an exemplary operational procedure for processing graphics data for transmission to a client including operations 1300, 1310, 1320, 1330, 1340, 1350, and 1360. Operation 1300 begins the operational procedure and operation 1310 illustrates establishing a first connection between a remote client and a compute server. The first connection can comprise connection 1105 of FIG. 11. Operation 1320 illustrates establishing a second connection between the compute server and a graphics server. The second connection can comprise connection 1115 of FIG. 11. Operation 1330 illustrates establishing a third connection between the remote client and the graphics server. The third connection can comprise connection 1125 of FIG. 11. Operation 1340 illustrates receiving graphics data by the compute server from the remote client over the first connection. The received graphics data can comprise, for example, a user graphics input such as a keyboard strike or a mouse click associated with the remote client. Operation 1350 illustrates processing the received graphics data and sending the processed graphics data to the graphics server over the second connection. The processing of the received graphics data can comprise the compute server translating the received graphics data into display commands and calls. Operation 1360 illustrates rendering, capturing, compressing, and transmitting the processed graphics data to the remote client over the third connection.

Figure 14:
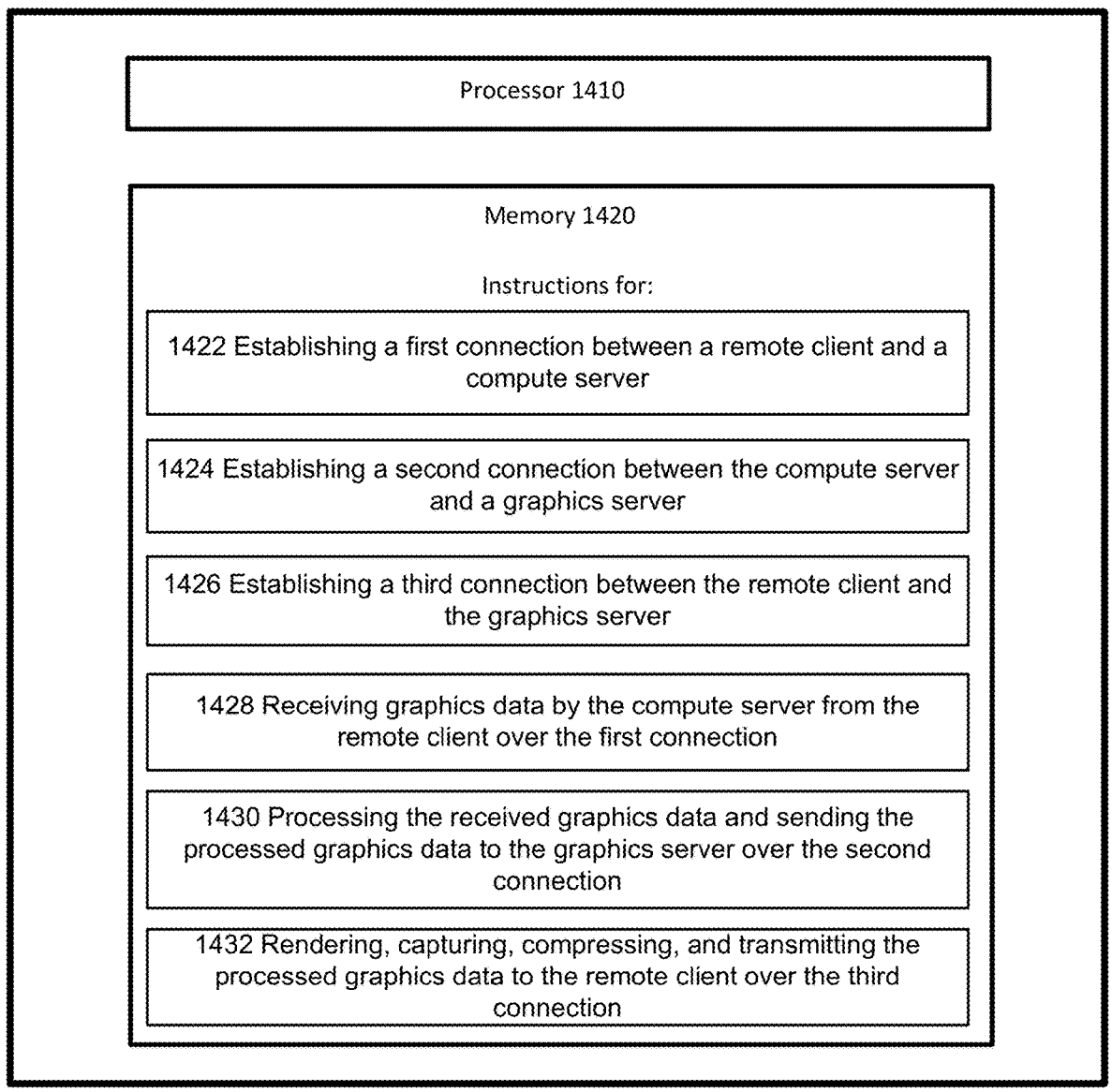
FIG. 14 depicts an example system and computer readable storage medium for practicing aspects of the present disclosure.

FIG. 14 depicts an exemplary system for processing graphics data for transmission to a client computer as described above. System 1400 comprises a processor 1410 and memory 1420. In an embodiment, the processor 1410 can be implemented as logical processing unit 102 in FIG. 1, while the memory 1420 can be implemented as having some or all of the components of the system memory 22 in FIG. 1. The memory 1420 further comprises computer instructions configured to cause the system to process graphics data for transmission to a remote client. Block 1422 illustrates establishing a first connection between a remote client and a compute server. Block 1424 illustrates establishing a second connection between the compute server and a graphics server. Block 1426 illustrates establishing a third connection between the remote client and the graphics server. Block 1428 illustrates receiving graphics data by the compute server from the remote client over the first connection. Block 1430 illustrates processing the received graphics data and sending the processed graphics data to the graphics server over the second connection. Block 1432 illustrates rendering, capturing, compressing, and transmitting the processed graphics data to the remote client over the third connection.

Any of the above mentioned aspects can be implemented in methods, systems, computer-readable media, or any type of manufacture.

The foregoing detailed description has set forth various embodiments of the systems and/or processes via examples and/or operational diagrams. Insofar as such block diagrams, and/or examples contain one or more functions and/or operations, it will be understood by those within the art that each function and/or operation within such block diagrams, or examples can be implemented, individually and/or collectively, by a wide range of hardware, software, firmware, or virtually any combination thereof.

It should be understood that the various techniques described herein may be implemented in connection with hardware or software or, where appropriate, with a combination of both. Thus, the methods and apparatus of the disclosure, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the disclosure. In the case of program code execution on programmable computers, the computing device generally includes a processor, a storage medium readable by the processor (including volatile and non-volatile memory and/or storage elements), at least one input device, and at least one output device. One or more programs that may implement or utilize the processes described in connection with the disclosure, e.g., through the use of an application programming interface (API), reusable controls, or the like. Such programs are preferably implemented in a high level procedural or object oriented programming language to communicate with a computer system. However, the program(s) can be implemented in assembly or machine language, if desired. In any case, the language may be a compiled or interpreted language, and combined with hardware implementations.

While the invention has been particularly shown and described with reference to a preferred embodiment thereof, it will be understood by those skilled in the art that various changes in form and detail may be made without departing from the scope of the present invention as set forth in the following claims. Furthermore, although elements of the invention may be described or claimed in the singular, the plural is contemplated unless limitation to the singular is explicitly stated.

What is claimed:

1. A remote server computer configured to provide a hosted virtual desktop infrastructure (VDI), comprising:
   a plurality of physical graphics processing units (GPUs);
   a first host partition configured as a graphics server having access to the physical GPUs, wherein the first host partition is configured to render graphics, capture the graphics, and encode the graphics, and to provide a first interface to the physical GPUs; and
   and a first guest partition configured as a first virtual machine, wherein the first virtual machine includes a first guest operating system (OS) and a first virtual graphics processing unit (vGPU), wherein the first vGPU is configured to provide a second interface between the first guest OS and the physical GPUs to share physical GPU resources in a hosted multi-user environment, and wherein the first guest partition is configured to effectuate a virtual desktop for coupled remote client computer, wherein the first guest partition is configured to communicate with the first host partition.

2. The remote server computer of claim 1, further comprising a hypervisor microkernel (1002) configured to effectuate a plurality of host and guest partitions.

3. The remote server computer of claim 2, wherein the first vGPU is further configured provide a virtual graphics adapter such that, when an application running in the first virtual machine invokes a graphics operation, the first vGPU communicates with the physical GPUs to obtain resources from the physical GPUs.

4. The remote server computer of claim 3, wherein the first vGPU communicates with the physical GPUs via the hypervisor microkernel, the hypervisor microkernel configured for memory sharing with the first vGPU, whereby resource requests for graphics-related devices are transferred from the first vGPU to the hypervisor microkernel.

5. The remote server computer of claim 4, wherein the first vGPU is further configured to provide a quality of service mechanism to the first virtual machine, whereby physical GPU resources are equitably delivered to the first virtual machine and any additional virtual machines installed on the remote server computer based on predetermined load-balancing policies.

6. The remote server computer of claim 1, wherein the first host partition is further configured to provide remote desktop virtual graphics management (RDVGM) functions to the first virtual machine, wherein the RDVGM functions include managing rendering, capturing, and compressing (RCC) processes using an RCC engine, assigning the physical GPU resources to the first virtual machine through the first vGPU, assigning resource policies to the first virtual machine, and load-balancing the physical GPU resources across multiple virtual machines.

7. The remote server computer of claim 6, wherein the RDVGM functions further include integrating the RCC engine for handling rendering, capturing, and compressing of graphics data.

8. The remote server computer of claim 7, wherein, when an application running within the first virtual machine issues display calls, the first vGPU brokers all rendering requests such that a virtualization path is transparent to the first guest OS, and wherein the graphics data are rendered on the physical GPUs into a frame buffer that represents a virtualized display of an end-user coupled to the first virtual machine using a remote client computer.

9. The remote server computer of claim 8, wherein the first host partition is further configured to capture rendered content such that each frame within the content is divided into units and change regions within a particular frame are processed through an optimization capability provided by the RCC engine, and wherein only particular regions within the particular frame that have changed are captured for encoding.

10. The remote server computer of claim 9, wherein the first host partition is further configured to compress the captured content using a compression process that gives the first virtual machine and any additional virtual machines a higher or lower priority, or configured to compress the captured content by controlling the compression process dynamically by a size of the change regions within a captured frame.

11. A method for providing a hosted virtual desktop infrastructure, comprising:
providing a remote server computer including:
a plurality of physical graphics processing units (GPUs);
a first host partition, wherein the first host partition is configured to render graphics, capture the graphics, and encode the graphics, and to provide a first interface to the physical GPUs;
a first guest partition configured to communicate with the first host partition; and
a hypervisor microkernel configured to effectuate a plurality of host and guest partitions;
configuring the first host partition as a graphics server having access to the physical GPUs;
configuring the first guest partition as a first virtual machine including a first guest operating system (OS) and a first virtual graphics processing unit (vGPU); and
configuring the first vGPU to provide a second interface between the first guest OS and the physical GPUs to share physical GPU resources in a hosted multi-user environment; and
configuring the first guest partition to effectuate a virtual desktop for a coupled remote client computer.

12. The method of claim 11, further comprising configuring the first vGPU to provide a virtual graphics adapter such that, when an application running in the first virtual machine invokes a graphics operation, the first vGPU communicates with the physical GPUs to obtain resources from the physical GPUs.

13. The method of claim 12, wherein the first vGPU communicates with the physical GPUs via the hypervisor microkernel, the method further comprising configuring the hypervisor microkernel for memory sharing with the first vGPU, whereby resource requests for graphics-related devices are transferred from the first vGPU to the hypervisor microkernel.

14. The method of claim 13, further comprising configuring the first vGPU to provide a quality of service mechanism to the first virtual machine, whereby the physical GPU resources are equitably delivered to the first virtual machine and any additional virtual machines installed on the remote server computer based on predetermined load-balancing policies.

15. The method of claim 11, further comprising configuring the first host partition to provide remote desktop virtual graphics management (RDVGM) functions to the first virtual machine, wherein the RDVGM functions include managing rendering, capturing, and compressing (RCC) processes using an RCC engine, assigning the physical GPU resources to the first virtual machine through the first vGPU, assigning resource policies to the first virtual machine, and load-balancing the physical GPU resources across multiple virtual machines.

16. The method of claim 15, wherein the RDVGM functions further include integrating the RCC engine for handling rendering, capturing, and compressing of graphics data.

17. The method of claim 16, wherein, when an application running within the first virtual machine issues display calls, the method further comprising configuring the first vGPU to broker all rendering requests such that a virtualization path is transparent to the first guest OS, and wherein the graphics data are rendered on the physical GPUs into a frame buffer that represents a virtualized display of an end-user coupled to the first virtual machine using a remote client computer.

18. The method of claim 17, further comprising configuring the first host partition to capture rendered content such that each frame within the content is divided into units and change regions within a particular frame are processed through an optimization capability provided by the RCC engine, and wherein only particular regions within the particular frame that have changed are captured for encoding.

19. The method of claim 18, further comprising configuring the first host partition to compress the captured content using a compression process that gives the first virtual machine and any additional virtual machines a higher or lower priority, or compress the captured content by controlling the compression process dynamically by a size of the change regions within a captured frame.

* * * * *